(12) United States Patent
Kawaai et al.

(10) Patent No.: US 9,157,671 B2
(45) Date of Patent: Oct. 13, 2015

(54) COOLING SYSTEM

(75) Inventors: Tsuyoshi Kawaai, Uji (JP); Kazuhiro Sekiguchi, Oura-gun (JP); Teruo Shimizu, Higashimatsuyama (JP); Masaru Koshiba, Kumagaya (JP)

(73) Assignee: PANASONIC INTELLECTUAL PROPERTY MANAGEMENT CO., LTD., Osaka-shi (JP)

(*) Notice: Subject to any disclaimer, the term of this patent is extended or adjusted under 35 U.S.C. 154(b) by 599 days.

(21) Appl. No.: 13/120,056

(22) PCT Filed: Sep. 25, 2009

(86) PCT No.: PCT/JP2009/004838
§ 371 (c)(1),
(2), (4) Date: Mar. 21, 2011

(87) PCT Pub. No.: WO2010/035466
PCT Pub. Date: Apr. 1, 2010

(65) Prior Publication Data
US 2011/0167853 A1 Jul. 14, 2011

(30) Foreign Application Priority Data
Sep. 25, 2008 (JP) .................. 2008-245233

(51) Int. Cl.
*F25B 5/02* (2006.01)
*F25D 11/00* (2006.01)
(Continued)

(52) U.S. Cl.
CPC . *F25B 49/02* (2013.01); *F25B 5/02* (2013.01); *F25B 2400/22* (2013.01); *F25B 2600/021* (2013.01); *Y02B 30/741* (2013.01)

(58) Field of Classification Search
CPC ........ F25B 49/025; F25B 5/02; F25B 41/043; F04B 49/065; F04B 1/08; F04B 2027/1818; G05D 23/2011; F25D 11/00
USPC ............. 62/228.3, 228.1, 132, 115, 126, 510, 62/226
See application file for complete search history.

(56) References Cited

U.S. PATENT DOCUMENTS 4,570,449 A * 2/1986 Knokey et al. .................. 62/183
5,265,434 A * 11/1993 Alsenz ............................ 62/117
(Continued)

FOREIGN PATENT DOCUMENTS

JP 62-009153 A 1/1987
JP 62-116862 A 5/1987
(Continued)

OTHER PUBLICATIONS

Japanese Office Action dated Dec. 11, 2012, issued in corresponding Japanaese Patent Application No. 2008-245233, with English translation (4 pages).
(Continued)

*Primary Examiner* — Mohammad M Ali
*Assistant Examiner* — Meraj A Shaikh
(74) *Attorney, Agent, or Firm* — Westerman, Hattori, Daniels & Adrian, LLP

(57) ABSTRACT

A cooling system 1 is constructed to have a refrigeration circuit 2 in which low-temperature showcases 7 as plural load facilities are connected to a rack system refrigerating machine 3 in parallel through refrigerant pipes 5a and 5b, a main controller 4 for generating and outputting control data of compressors 9 constructing the rack system refrigerating machine 3 on the basis of the cooling state of the low-temperature showcases 7, and a compressor controller 6 which is constructed to acquire control setting required for capacity control of the compressors 9 as main elements of the rack system refrigerating machine 3, receives control data from the main controller 4 and controls the compressors 9 on the basis of the control setting and the control data.

8 Claims, 21 Drawing Sheets

(51) Int. Cl.
*F04B 1/08* (2006.01)
*F25B 49/02* (2006.01)

(56) References Cited

U.S. PATENT DOCUMENTS

| | | | |
|---|---|---|---|
| 2004/0211202 | A1 | 10/2004 | Katogi et al. |
| 2005/0247073 | A1* | 11/2005 | Hikawa et al. ............... 62/228.1 |
| 2005/0252222 | A1 | 11/2005 | Jessen et al. |
| 2007/0022767 | A1* | 2/2007 | Singh et al. .................... 62/200 |

FOREIGN PATENT DOCUMENTS

| | | | |
|---|---|---|---|
| JP | 2004-057347 | A | 2/2004 |
| JP | 2004057347 | A * | 2/2004 |
| JP | 2007-107730 | A | 4/2007 |
| JP | 2007107730 | A * | 4/2007 |

OTHER PUBLICATIONS

Notification of Transmittal of Translation of the International Preliminary Report on Patentability (Forms PCT/IB/326) of International Application No. PCT/JP2009/004838 mailed Apr. 7, 2011 with forms PCT/IB/373, PCT/IB/ 338 and PCT/ISA/237.
International Search Report of PCT/JP2009/004838, date of mailing Jan. 12, 2010.
Extended European Search Report dated Nov. 17, 2014, issued in corresponding EP Application No. 09815888.4 (6 pages).

* cited by examiner

FIG.8

| STEP NO. | FIRST COMPRESSOR (CAPACITY A) | SECOND COMPRESSOR (CAPACITY B(>A)) | TOTAL OUTPUT |
|---|---|---|---|
| 1 | OFF | OFF | 0 |
| 2 | ON | OFF | A |
| 3 | OFF | ON | B |
| 4 | ON | ON | A+B |

FIG.18

| CONDENSER FAN NO. | CUT-IN(PSI) | CUT-OUT(PSI) |
|---|---|---|
| 1 | 220 | 205 |
| 2 | 210 | 195 |
| 3 | 200 | 185 |
| 4 | 190 | 175 |
| 5 | 180 | 165 |
| 6 | 170 | 155 |

COOLING SYSTEM

TECHNICAL FIELD

The present invention relates to a cooling system comprising a low-temperature showcase installed in a supermarket or the like, and a refrigerating machine for supplying refrigerant to the low-temperature showcase, and particularly to a control technique for a cooling system having a refrigerating machine which is freely constructed by selecting main elements from some types of main elements.

BACKGROUND ART

There has been known a cooling system constructed by connecting plural low-temperature showcases such as freezing/chilling showcases or the like to a refrigerating machine in parallel through refrigerant pipes. A plurality of low-temperature showcases as described above are installed in a store such as a supermarket or the like, and provided to display or sell foods while freezing or chilling the foods.

In general, the refrigerating machine is configured by mounting and packaging one or plural compressors and condenser fans and a microcomputer for controlling them within a housing. The microcomputer controls the compressors and the condenser fans on the basis of a predetermined operation sequence to construct a refrigeration cycle together with the low-temperature showcases, thereby cooling the low-temperature showcases.

Recently, from the viewpoint of dealing with environment problems and reducing the energy cost, much attention has been recently paid to countermeasures for reducing power consumption of cooling systems even in stores such as supermarkets, etc. Therefore, a low-temperature showcase is provided with a microcomputer, an inside temperature sensor and an electromagnetic valve for controlling flow-in of refrigerant, and the microcomputer controls the opening/closing of the electromagnetic valve so that the inside temperature is kept to an inside set temperature, thereby increasing the operation efficiency. Furthermore, even a refrigerating machine is provided with a low-pressure side pressure sensor for detecting the refrigerant pressure at the low-pressure side, and a microcomputer controls a compressor so that the pressure at the low-pressure side is kept to a predetermined set value, thereby enhancing energy saving performance (for example, see patent document 1).

Furthermore, there has been recently implemented a cooling system in which the refrigerating machine is controlled to prevent needless cooling with keeping the inside temperature of the low-temperature showcase to the inside set temperature by cooperating the low-temperature showcase and the refrigerating machine with each other, whereby both maintenance of the cooling performance of the low-temperature showcase and enhancement of the energy saving performance of the refrigerating machine are performed. According to this cooling system, a controller for controlling the operation of the refrigerating machine is provided, and a proper value is set to the refrigerant pressure at the low-pressure side of the refrigerating machine and output to the refrigerating machine, whereby the energy saving performance of the refrigerating machine with keeping the cooling performance of the low-temperature showcase (for example, see Patent Document 2).

PRIOR ART DOCUMENT

Patent Document 1: JP-A-62-116862
Patent Document 2: JP-A-2004-57347

SUMMARY OF THE INVENTION

Problem to be Solved by the Invention

The maximum cooling capacity of the refrigerating machine is uniquely determined by the capacity of a compressor to be installed or the capability of a condenser to be installed. On the other hand, the maximum cooling capacity required at an installation place of the cooling system is determined by the number of low-temperature showcases connected to the refrigerating machine, inside set temperature, environmental conditions such as in-store temperature, outside temperature, etc. Accordingly, when a cooling system is installed, a refrigerating machine which has an extra capacity with respect to the required maximum cooling capacity is selected and installed. In this case, the maximum cooling capacity is determined every refrigerating machine as described above, and thus if a maker or the like does not prepare any refrigerating machine having a proper maximum cooling capacity which is matched to the environmental condition when the cooling system is installed, a refrigerating machine having a superfluous maximum cooling capacity with respect to the proper maximum cooling capacity must be installed, so that vainness occurs in the cooling capacity.

Therefore, a user or the like freely selects the capacity of a compressor, the capability of a condenser and/or a condenser fan which are main elements for determining the maximum cooling capacity of the refrigerating machine from products of the same maker or other makers in conformity with the maximum cooling capacity (thermal load) required under an environmental condition that they are installed, and combines the selected products by himself/herself to enable the refrigerating machine to be freely constructed, whereby a refrigerating machine having the optimum maximum cooling capacity can be constructed (the refrigerating machine as described above is hereinafter referred to as "rack system refrigerating machine"). In this rack system refrigerating machine, the main elements are combined in conformity with the required maximum cooling capacity, and thus as compared with a conventional packaged refrigerating machine, a cooling system having no needless cooling capacity and a high energy saving efficiency can be implemented.

However, the thermal load of the low-temperature showcase is greatly dependent on the environmental conditions such as the outside temperature, the in-store temperature, etc. which vary from hour to hour during operation of the cooling system (hereinafter referred to as "operation environmental condition"), and thus when the rack system refrigerating machine is operated under a fixed cooling capacity, needless cooling is performed under a low thermal load. As described above, the rack system refrigerating machine is constructed on the assumption of the optimum cooling capacity, and thus it is assumed that it is unnecessary to provide means for cooperating the operation of the rack system refrigerating machine with the state of the low-temperature showcase. Accordingly, it has been hitherto impossible to operate the rack system refrigerating machine in conformity with the thermal load of the low-temperature showcase.

Furthermore, a microcomputer program for an operation sequence optimized to the types of main elements such as installed compressor, condenser fan, etc. (for example, a method of setting a low-pressure side pressure set value, etc.) is pre-installed in a microcomputer of a conventional refrigerating machine. Accordingly, in order to perform the control of achieving an energy saving effect by changing the cooling capacity in accordance with the thermal load of the low-temperature showcase in the rack system refrigerating machine whose main elements are freely combined, it is required to estimate all arbitrary combinations of these main elements and pre-install them as a microcomputer program or it is required to make the refrigerating machine adaptable to all arbitrary combinations of the main elements by changing a part of the microcomputer program. However, it is very difficult to implement these requirements, and thus it has been difficult to perform the control of achieving the energy saving effect by the microcomputer.

The present invention has been implemented in view of the foregoing situation, and has an object to enable both of maintenance of the cooling performance of load facilities such as a low-temperature showcase, etc. and enhancement of the energy saving performance of a refrigerating machine in a cooling system which is freely constructed by selecting main elements from some types thereof.

Means of Solving the Problem

In order to attain the above object, according to the present invention, there is provided a cooling system characterized by comprising: a refrigeration circuit constructed by connecting a plurality of load facilities in parallel through a refrigerant pipe to a refrigerating machine that is freely constructed by selecting main elements determining a cooling capacity from some types; a main control device for generating and outputting control data of main elements constructing the refrigerating machine on the basis of a cooling state of the load facilities; and a main element control device that is configured to acquire control setting required for control of the main elements constructing the refrigerating machine, has receiving means for receiving control data from the main control device and controls the main elements on the basis of the control setting and the control data.

Furthermore, according to the present invention, in the above cooling system, the main control device generates the control data for defining a target value of the cooling capacity on the basis of the cooling state, and the main element control device controls the main elements on the basis of the control setting so that the cooling capacity of the refrigerating machine approaches to the target value.

Furthermore, according to the present invention, in the above cooling system, the control setting is information for defining capacity control of compressors constructing the refrigerating machine.

Furthermore, according to the present invention, in the above cooling system, the main control device acquires a low-pressure side pressure set value of the refrigerating machine as a target value of the cooling capacity at a predetermined period, determines a cooling state of the load facilities, accumulates the low-pressure side pressure set value and a determination result of the cooling state to learn an optimum low-pressure side pressure set value to the same operation environmental condition, and registers the low-pressure side pressure set value as the control data into a data base every operation environmental condition, and the main element control device receives a detection value of the low-pressure side pressure of the refrigerating machine to calculate a deviation pressure based on the detection value and the low-pressure side pressure set value received as the control data, and controls the main elements on the basis of the deviation pressure and the control setting.

Furthermore, according to the present invention, in the above cooling system, the control setting is information for defining capacity control of compressors constructing the refrigerating machine in accordance with the deviation pressure between the low-pressure side pressure of the refrigerating machine and the low-pressure side pressure set value.

Still furthermore, according to the present invention, in the cooling system, the load facilities are low-temperature showcases that construct a refrigeration cycle with the refrigerating machine.

Effect of the Invention

According to the present invention, there is provided the main element control device which acquires the control setting required for the control of the main elements constructing the refrigerating machine, receives the control data based on the cooling state of the low-temperature showcases and controls the main elements on the basis of the control setting and the control data. Therefore, even in the cooling system having the refrigerating machine which is freely constructed by arbitrarily selecting the main elements determining the cooling capacity from some types, the cooling capacity of the refrigerating machine can be controlled in accordance with the cooling state of the low-temperature showcases without providing any microcomputer to the refrigerating machine. Therefore, both the maintenance of the cooling performance of the low-temperature showcases and the enhancement of the energy saving performance of the refrigerating machine can be implemented.

BRIEF DESCRIPTION OF THE DRAWINGS

FIG. 8 is a diagram showing an example of a capacity control rule as control setting.
FIG. 18 is a diagram showing an example of a control rule as control setting.

BEST MODES FOR CARRYING OUT THE INVENTION

Embodiments according to the present invention will be described hereunder with reference to the drawings.

First Embodiment

Figure 1:
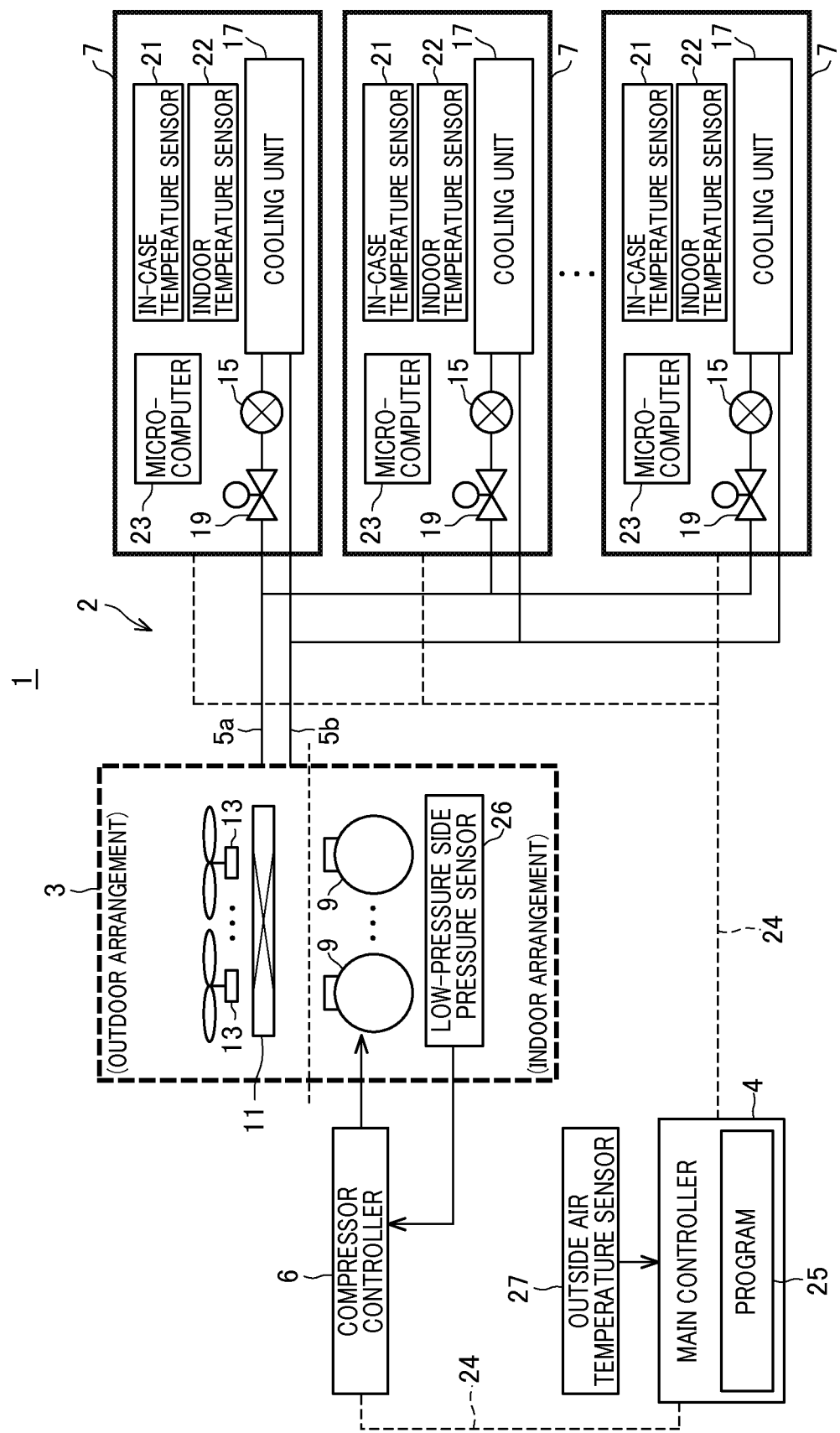
FIG. 1 is a diagram showing the construction of a cooling system according to a first embodiment.

FIG. 1 is a diagram showing the construction of a cooling system 1 according to an embodiment.

As shown in the figure, the cooling system 1 has a refrigeration circuit in which plural low-temperature showcases 7 are connected to a rack system refrigerating machine 3 through a refrigerant pipe 5a as a liquid pipe and a refrigerant pipe 5b as a gas pipe in parallel, a main controller (main control device) 4 and a compressor controller (main element control device) 6.

The rack system refrigerating machine 3 has plural compressors 9, a condenser 11, and a condenser fan 13. Each of the compressors 9 is a capacity fixed type compressor, the total capacity, that is, the cooling capacity is variable on the basis of the number of actuated compressors.

Each of the low-temperature showcase has an expansion valve (pressure-reducing device) 15 and a cooling unit 17, and a liquid electromagnetic valve 19 is connected to the entrance of the expansion valve 15.

The liquid electromagnetic valve 19 is a valve for controlling supply of refrigerant to the expansion valve 15, and the in-case temperature of the low-temperature case 7 based on the cooling operation of the cooling unit 17 is controlled by opening/closing the liquid electromagnetic valve 19.

That is, the low-temperature showcase 7 has an in-case temperature sensor 21 for detecting the in-case temperature and a microcomputer 23, and the microcomputer 23 stores upper limit temperature and low limit temperature set at the upper and lower sides of in-case set temperature and executes ON-OFF control of opening the liquid electromagnetic valve 19 at the upper limit temperature and closing the liquid electromagnetic valve 19 at the lower limit temperature. Accordingly, the in-case temperature of the low-temperature showcase 7 is made to approach the in-case set temperature on average. Other load facilities such as a cooling/refrigerating prefabricated case, etc. may be connected to the rack system refrigerating machine 3 in addition to the low-temperature showcases. The load facilities are facilities constituting the refrigerating cycle together with the refrigerating machine.

The rack system refrigerating machine 3 is freely configured so that compressors 9 as main elements for determining the cooling capacity are freely selected from several kinds of compressors and combined with one another on the basis of the required maximum cooling capacity. In this rack system refrigerating machine 3, it is unnecessary to package the elements in one housing, and thus the condenser 11 and the condenser fan 13 may be disposed outdoors while the compressors 9 are disposed indoors, whereby retention of heat can be prevented. Furthermore, there is no restriction of the housing to the installation space, and thus the degree of freedom to determine the number of compressors 9 can be enhanced.

Furthermore, in this rack system refrigerating machine 3, the machine types and number of the compressors are unstable, and thus it is difficult to construct a refrigerating machine so that a microcomputer is contained in the refrigerating machine and the microcomputer controls the capacity of each of the compressors 9 so as to achieve energy saving as in the case of conventional refrigerating machines. Therefore, in the cooling system 1, a compressor controller (main element control device) for controlling the compressors 9 is provided separately from the rack system refrigerating machine 3. The compressor controller 6 controls ON/OFF of each of plural capacity fixed type compressors 9 on the basis of control data from the main controller 4 to vary the capacity, and the construction of the compressor controller 6 will be described later.

The main controller 4 is connected to each low-temperature showcase 7 and the compressor controller 6 through a communication line 24, and has a microcomputer which is operated on the basis of a program 25 for defining a predetermined operation sequence, a communication device, etc. The main controller 4 generates and outputs control data for controlling the cooling capacity of the rack system refrigerating machine 3 on the basis of a cooling state of each low-temperature showcase 7 (cooling degree in the case).

The control data contains control setting for defining a control rule as to how to control the capacity of the compressors 9 for cooling capacity control (compressor control setting), and a low-pressure side pressure set value as a target value of low-pressure side pressure as an index value of cooling capacity.

More specifically, in the rack system refrigerating machine 3, the types and number of compressors 9 are determined when they are installed, and thus it is impossible to preinstall a program defining how to control the capacity of the compressors 9. Therefore, in this embodiment, the control setting which defines the control rule for the capacity control of the compressors 9 installed in the rack system refrigerating machine 3 is input from the main controller 4 to the compressor controller 6.

The control setting of this embodiment defines a rule when the number of compressors 9 to be driven is determined in accordance with the deviation pressure between the low-pressure side pressure and the low-pressure side pressure set value. For example, when the low-pressure side pressure of the rack system refrigerating machine 3 is lower than the low-pressure side pressure set value, in order to represent that the cooling capacity is excessively high, the control is performed so that the number of compressors to be set to ON is reduced to reduce the capacity. In the control setting, the number of compressors 9 to be set to OFF at this time is defined in accordance with the deviation pressure (at the maximum value, all the compressors are turned off). Likewise, this control setting defines the number of compressors 9 to be set to ON in accordance with the deviation pressure in order to increase the cooling capacity when the low-pressure side pressure of the rack system refrigerating machine 3 is lower than the low-pressure side pressure set value (at the maximum value, all the compressors are turned on).

The target cooling capacity is varied in accordance with operation environmental condition such as in-store temperature, out-of-store temperature and a time zone, and thus the main controller 4 increases or reduces the low-pressure side pressure set value to generate control data on the basis of the operation environmental condition so that no needless cooling capacity occurs.

The construction of the main controller 4 will be described hereunder with reference to FIG. 2.

Figure 2:
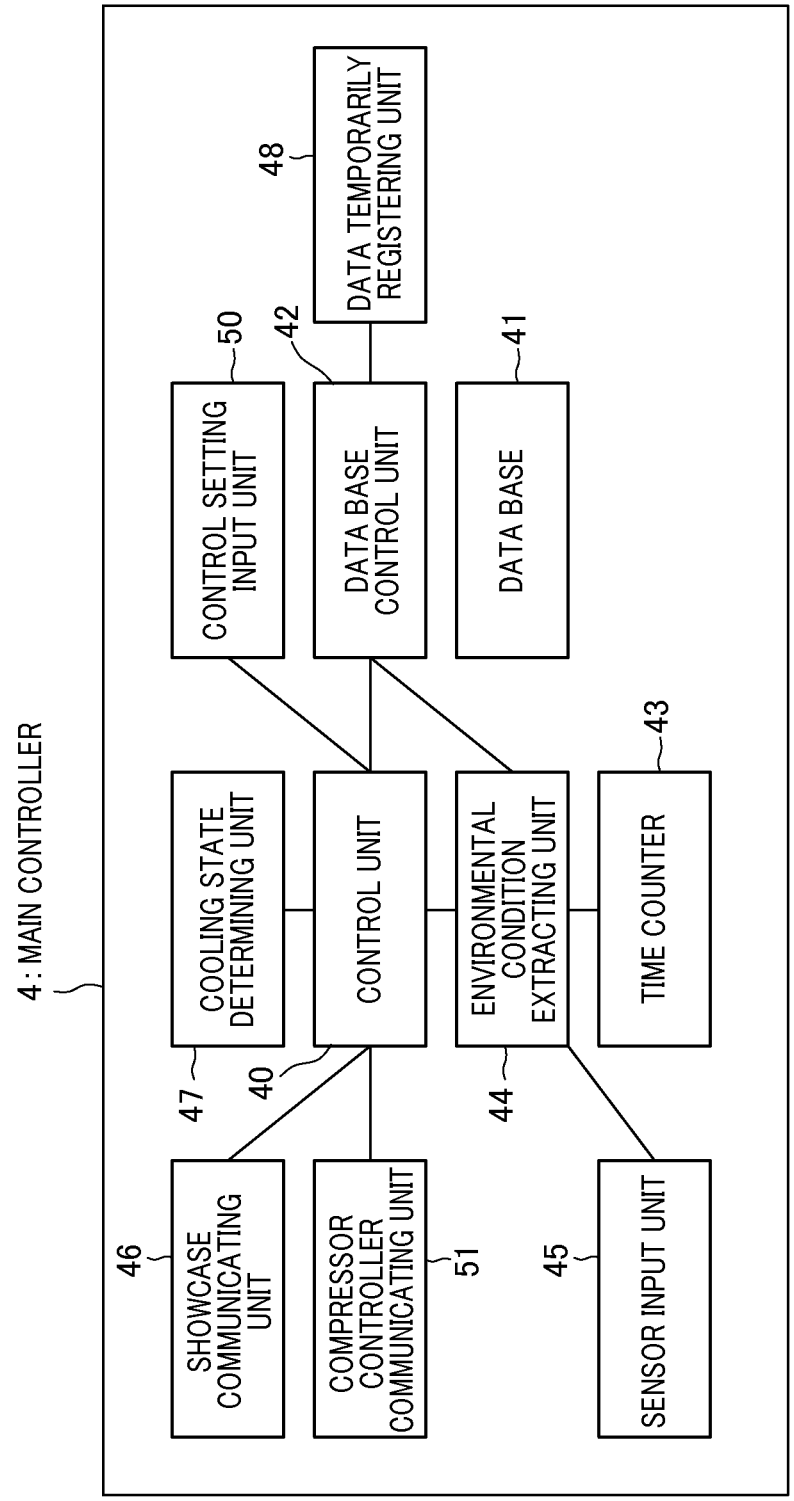
FIG. 2 is a block diagram showing a main controller.

FIG. 2 is a block diagram showing the functional construction of the main controller 4.

In this figure, a control unit 40 centrally controls each part of the main controller 4.

The data base 41 registers the low-pressure side pressure set value as the control data every operation environmental condition, and a data base control unit 42 controls reading/writing from/into the data base 41 concerned. The registration place of the low-pressure side set value is classified on the basis of three conditions of the in-store temperature, the out-of-store temperature and the time zone which serve as indexes for determining the operation environmental condition, and the low-pressure side set values are registered as discrete data which are classified to plural stages.

The discretization rule in this case is as follows.

In-store temperature Ti (° C.): the range of 0° C. to +35° C. is classified into eight stages at an interval of 5 deg (actually, an average value per hour is adopted).

Time zone t: the time is classified into 24 stages at an interval of one hour.

Accordingly, totally 1920 registration places are constructed.

The in-store temperature Ti and the out-of-store temperature To of the operation environmental condition are conditions affected by the natural environment. Furthermore, the cooling state of the low-temperature showcase 7 is affected by not only the natural environment, but the frequency of taking foods in and out by salesclerk and customers, turn-off of illumination for energy saving when a store is closed, closing of a night cover, etc., however, such a condition can be determined on the basis of the time zone. When the in-store temperature Ti is lower than 0° C., it is treated as 0° C., and when the in-store temperature Ti is higher than +35° C., it is treated as +35° C. When the out-of-store temperature To is lower than −5° C., it is treated as −5° C., and when the out-of-store temperature To is higher than +40° C., it is treated as +40° C.

Figure 3:
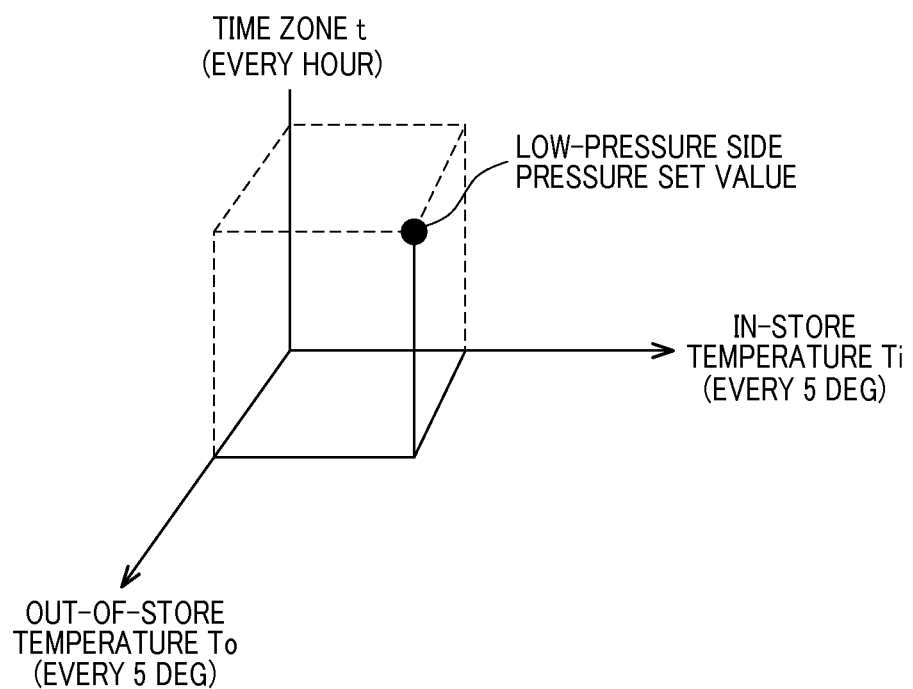
FIG. 3 is a diagram showing a data base of the main controller.

As shown in FIG. 3, optimum low-pressure side pressure set values which are leaned in connection with the operation of the cooling system are successively registered in the respective registration places of the data base 41. At the initial stage of the installation of the cooling system, a default value of the low-pressure side pressure set value is pre-registered as an initial value of the control data at each registration place of the data base 41. This default value is set to a value for an environment in the summer season under which the cooling capacity is most greatly required, and power consumption is generally set to a high value because the cooling capacity is surplus.

A time counter 43 counts the time and outputs the time to an environmental condition extracting unit 44, and in-store temperature and out-of-store temperature are input from an in-store temperature sensor (indoor temperature sensor) 22 and an outside air temperature 27 to a sensor input unit 45, and output to the environmental condition extracting unit 44. In this embodiment, as shown in FIG. 1, the in-store temperature sensor 22 is provided to each low temperature showcase 7, and the outside air temperature sensor 27 is disposed so that the ambient temperature of the condenser 11 can be detected. The environmental condition extracting unit 44 extracts an operation environmental condition for referring to the data base 41 (a combination of the in-store temperature Ti, the out-of-store temperature To and the time zone) from the respective inputs of the time counter 43 and the sensor input unit 45 according to the discretization rule.

A showcase communicating unit 46 communicates with the microcomputer 23 of each low-temperature showcase 7 through the communication line 24. Through this communication, the deviation temperature between the in-case temperature and the in-case set temperature and the in-store temperature Ti are obtained.

A cooling state determining unit 47 determines the cooling state of each low-temperature showcase 7 (the cooling degree in the showcase). Specifically, the cooling state determining unit 47 calculates average deviation temperature Te (deg) per fixed time (actually, one hour) from the deviation temperature transmitted from each low-temperature showcase 7, and determines whether the average deviation temperature Te is equal to or more than a preset threshold value A for all the low-temperature showcases 7. When the average deviation temperature Te is less than the threshold value A for all the low-temperature showcases 7, the determination result of the cooling state is set as "good", and when there exists at least one showcase whose average deviation temperature Te is equal to or more than the threshold value A, the determination result of the cooling state is set as "No good". This threshold value A is a value for determining whether the average deviation temperature Te is good or not good, and it is set to a value with which the inside of the low-temperature showcase 7 can be maintained to a sufficiently good cooling state.

A data temporary registration unit 48 temporarily accumulates a predetermined number of determination results of the cooling state which are obtained as a result of the operation based on the low-pressure side pressure set value output to the rack system refrigerating machine 3 and the low-pressure side pressure set value. When the predetermined number of determination results with respect to the same operation environmental condition are accumulated, the optimum low-pressure side pressure set value to the operation environmental condition concerned is leaned on the basis of these data, and registered in the data base 41.

Subsequently, the control setting defining the capacity control of the compressors 9 is input to the control setting input unit 50. A specific example of the control setting is described above. A compressor controller communicating unit 51 outputs the control data containing the control setting and the low-pressure side pressure set value to the controller 6 through the communicating line 24. When the compressor controller 6 is constructed to hold the control setting, it is unnecessary to contain the control data into each control data.

Figure 4:
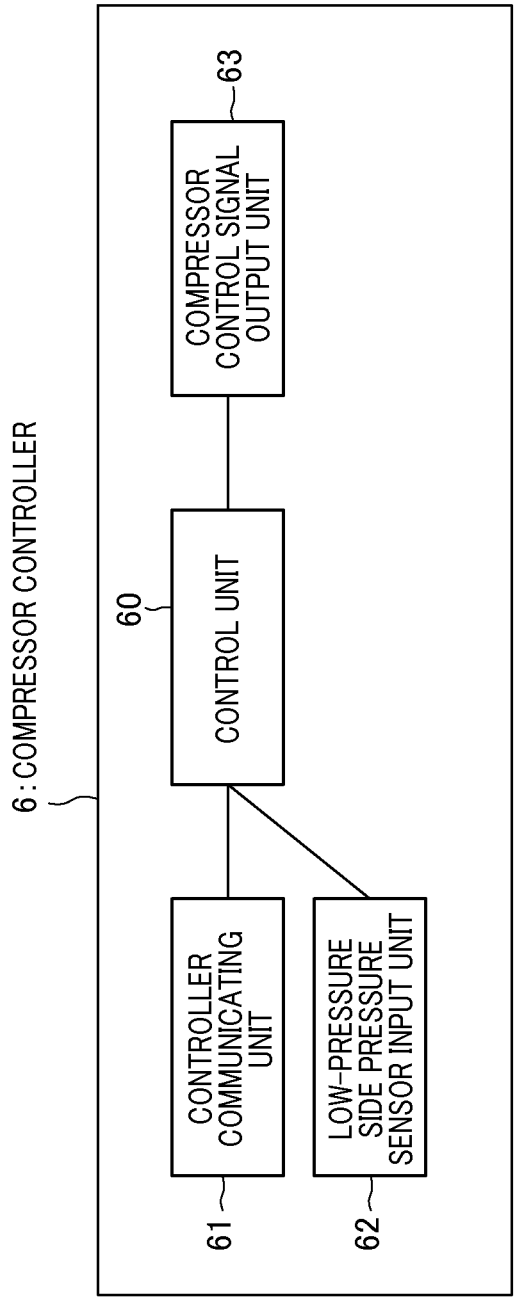
FIG. 4 is a block diagram showing a compressor controller.

FIG. 4 is a block diagram showing the functional construction of the compressor controller 6.

In this figure, the control unit 60 centrally controls each part of the compressor controller 6, and also generates a compressor control signal for controlling ON/OFF of the compressors 9. For example, it is constructed by a microcomputer. The controller communicating unit 61 communicates with the main controller 4 through the communication line 24, and receives the above control data. Upon reception of the control data, the control setting and the low-pressure side set value are achieved. A detection value of the low-pressure side pressure is input to the low-pressure side pressure sensor input unit 62 from the low-pressure side pressure sensor 26 provided to the rack system refrigerating machine 3. The control unit 60 calculates the deviation pressure on the basis of the low-pressure side pressure set value contained in the control data and the detection value of the low-pressure side pressure, and determines the number of compressors 9 to be turned on/off on the basis of the control setting contained in the control data, thereby generating a compressor control signal. The compressor control signal output unit 63 outputs the compressor control signal to the compressors 9 of the rack system refrigerating machine 3.

The compressor controller 6 may be provided with the same construction as the control setting input unit 50 provided to the main controller 4 so that the control setting is not input to the compressor controller 6 through the main controller 4, but directly input to the compressor controller 6.

Figure 5:
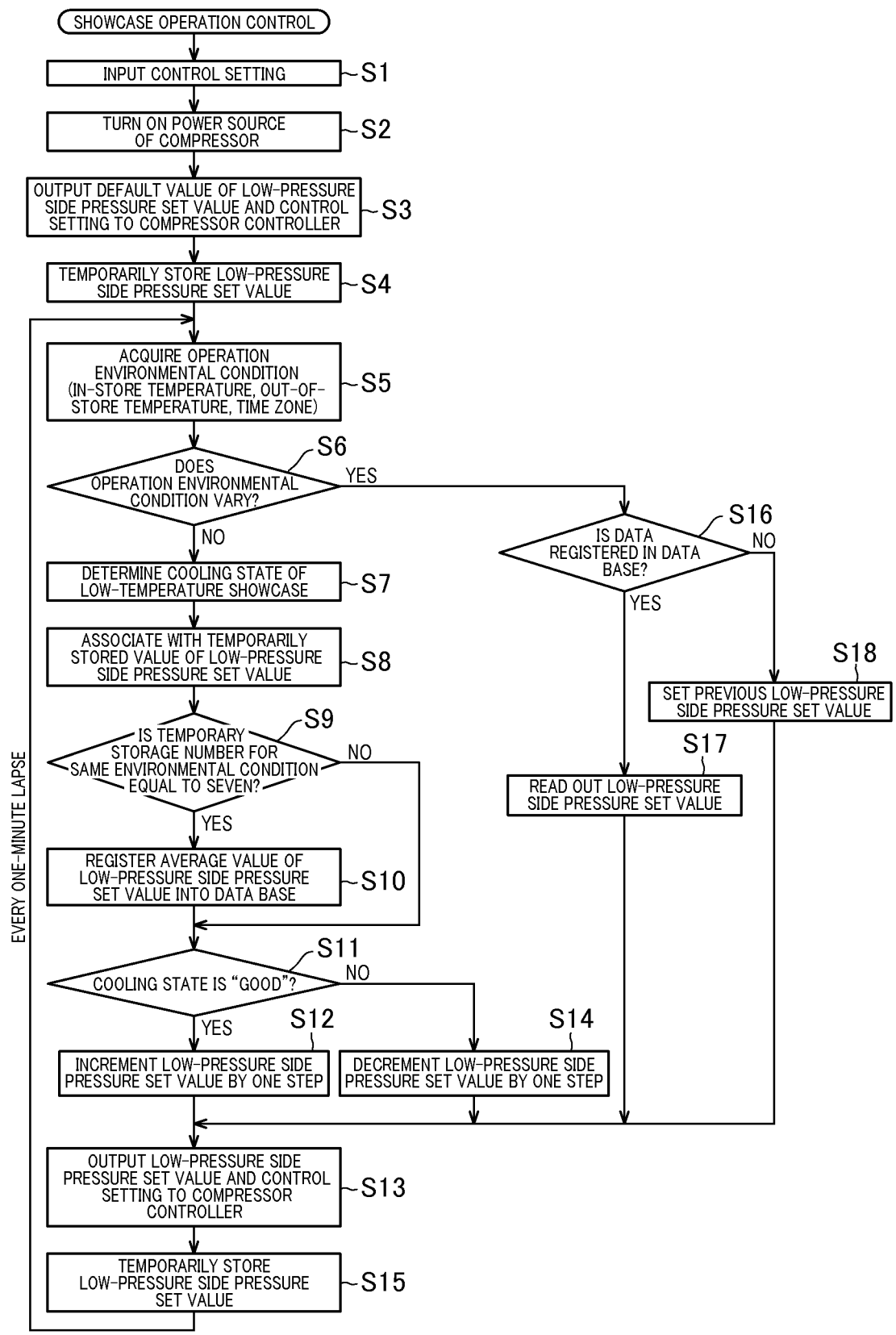
FIG. 5 is a flowchart showing the operation of the cooling system.

FIG. 5 is a flowchart showing the operation of the thus-constructed cooling system 1.

In the cooling system 1, the main controller 4 outputs the control data containing the control setting and the low-pressure side pressure set value described above to the compressor controller 6, and the compressor controller 6 performs capacity control of each compressor 9 of the rack system refrigerating machine 3 on the basis of the control data.

At this time, since the control setting is unclear at the initial stage that the cooling system 1 is installed, the control setting based on the construction of the compressors 9 is input to the main controller 4 by a service man or the like (step S1), and the power source of the compressors 9 is turned on and allowed to operate (step S2).

subsequently, the main controller 4 reads out the learned low-pressure side pressure set value from the data base 41 to perform the control. At the initial stage that the cooling system 1 is installed, the low-pressure side set value has not yet been learned and thus a default value is used. That is, the main controller 4 reads out from the data base 5Y41 the default value of the low-pressure side pressure set value for the operation environmental condition comprising the three conditions of the in-store temperature Ti, the out-of-store temperature To and the time zone t, and outputs the read-out default value as the control data together with the control setting (step S3). Furthermore, in order to learn whether the low-pressure side pressure set value output to the compressor controller 6 is good or not good, the main controller 4 temporarily stores the low-pressure side pressure set value in association with the operation environmental condition (step S4).

When the control data is input to the compressor controller 6, the compressor controller 6 calculates the deviation pressure between the low-pressure side pressure set value contained in the control data and the detection value of the low-pressure side pressure as described above, determines the number of compressors 9 to turned on/off on the basis of the control setting contained in the control data to generate the compressor control signal, and outputs this compressor control signal to the rack system refrigerating machine 3. Accordingly, even in the case of the rack system refrigerating machine 3 having no microcomputer, the capacitance control of the compressors 9 is implemented on the basis of the low-pressure side pressure set value transmitted from the main controller 4.

Thereafter, the main controller 4 executes the processing of determining the cooling state of the low-temperature showcase 7, learning the optimum value of the low-pressure side pressure set value, generating the control data containing the low-pressure side pressure set value, etc. in accordance with variation or non-variation of the operation environmental condition at a time interval of 1 minute, for example.

That is, the main controller 4 acquired each operation environmental condition comprising the in-store temperature Ti, the out-of-store temperature To and the time zone t (step S5), and determines whether the operation environmental condition varies or not (step S6). As described above, each of the in-store temperature Ti and the out-of-store temperature To are discretized every 5 degree and the time zone t is discretized every hour, when the variation width of any of the in-store temperature Ti, the out-of-store temperature To and the time zone t exceeds a discretization range, it is determined that the operation environmental condition varies.

When the operation environmental condition does not vary (step S6: NO), the main controller 4 determines the cooling state on the basis of the deviation temperature transmitted from each low-temperature showcase 7 to learn the optimum value of the low-pressure side pressure set value to this operation environmental condition (step S7), and associates the determination result of "good" or "not good" of the cooling state with the temporarily stored low-pressure side pressure set value (step S8). When the number of the temporarily-stored low-pressure side pressure set values and the "good" or "not good" results of the cooling state reaches a predetermined number (seven in the example of the figure) (step S9: YES), the average value of the low-pressure side pressure set values is registered in the operation environmental condition of the data base 41 to learn the optimum value (step S10). When the optimum value is learned, there may be adopted any learning method of adopting the average value of only the low-pressure side pressure set values with which the cooling state is determined as "good" or adopting an average value after the low-pressure side pressure set value is weighted in accordance with "good or not good" of the cooling state.

Subsequently, when the cooling state is "good" (step S11: YES), the main controller 4 determines that there is an extra cooling capacity for the operation environmental condition at the present time point, sets the low-pressure side pressure set value to a value which is increased by a fixed value (for example, 0.005 Mpa) (step S12), and outputs the thus-set low-pressure side pressure set value as control data to the compressor controller 6 (step S13). The compressor controller 6 controls the capacities of the compressors 9 of the rack system refrigerating machine 3 on the basis of the low-pressure side pressure set value transmitted from the main controller 4. At this time, the low-pressure side pressure set value is set to a high value, so that the cooling capacity is lowered and the power consumption is also reduced. According to this control, when it is determined that there is an extra cooling capacity in the cooling system 1, the cooling capacity of the rack system refrigerating machine 3 is lowered to reduce the power consumption, and also the in-case deviation temperature of the low-temperature showcase 7 is kept to the neighborhood of a threshold value A.

On the other hand, when the cooling state is "not good" (step S11: NO), the low-pressure side pressure set value is set to a value which is reduced by a fixed value (for example, 0.005 Mpa) (step S14), and outputs the thus-set low-pressure side pressure set value as control data to the compressor controller 6 (step S14). In the compressor controller 6, the low-pressure side pressure set value is set to a low value, whereby the cooling capacity is enhanced and the cooling state is improved to be good.

When the low-pressure side pressure set value is output as the control data to the compressor controller 6, the main controller 4 temporarily stores the "good" or "not good" of the low-pressure side pressure set value in association with the operation environmental condition to performing the learning in step S10 (step S15).

Through the processing as described above, by performing an annual operation through the cycle of the seasons, low-pressure side pressure set values having a high power saving effect which are gradually actually measured under the same operation environmental condition are successively registered in the data base 41.

When the operation environmental condition varies in the determination of step S6 (step S6: YES), the main controller 4 determines whether a low-pressure side pressure set value proper to this operation environmental condition is registered in the data base 41 or not (step S16). When it is registered (step S16: YES), the main controller 4 reads out the low-pressure side pressure set value concerned from the data base 41 (step S17) to output it to the compressor controller 6 and temporarily store it in the above steps S13, S15. Accordingly, the optimum low pressure side pressure set value having a high energy saving effect which has been already learned for the operation environmental condition is set and output as control data.

Furthermore, when no low-pressure side pressure set value is registered in the data base 41 (step S16: NO), the main controller 4 regards that the in-store temperature Ti and the out-of-store temperature To do not greatly vary at the level of the time interval of about one minute. Therefore, the main controller 4 sets the same value as the just-before (before one minute) low-pressure side pressure set value (step S18), and performs the output to the compressor controller 6 and the temporary storage in the above steps S13, S15.

In this embodiment, the main controller 4 transmits the control data to the compressor controller 6 while the control setting is contained in the control data, however, the present invention is not limited to this style. Only at the initial stage, the control data may be transmitted to the compressor controller 6 while the control setting is contained in the control data, and stored in the compressor controller 6. Subsequently, the compressor controller 6 may refer to the stored control setting to perform the capacity control of the compressors 9.

As described above, according to this embodiment, the compressor controller 6 is separately provided to the rack system refrigerating machine 3 which is constructed by arbitrarily selecting the compressors 9 as an example of the main elements in conformity with a requirement for the cooling capacity when the rack system refrigerating machine 3 is installed, the compressor controller 6 receives the control data from the main controller 4, and the compressors 9 are controlled on the basis of the control data concerned. Accordingly, even in the cooling system having the rack system refrigerating machine 3, the rack system refrigerating machine 3 can perform the operation control having the high energy saving effect in accordance with the cooling state of the low-temperature showcases 7 without being provided with any microcomputer.

Furthermore, according to this embodiment, the compressor controller 6 is enabled to acquire the control setting for defining the control rule of the compressors 9 constituting the rack system refrigerating machine 3 (compressor control setting) and the low-pressure side pressure set value as a target value of the control index of the cooling capacity, and thus the capacity control can be performed without installing the construction of the compressors 9 of the rack system refrigerating machine 3 and the capacitance control rule as programs or the like into the compressor controller 6.

Second Embodiment

Figure 6:
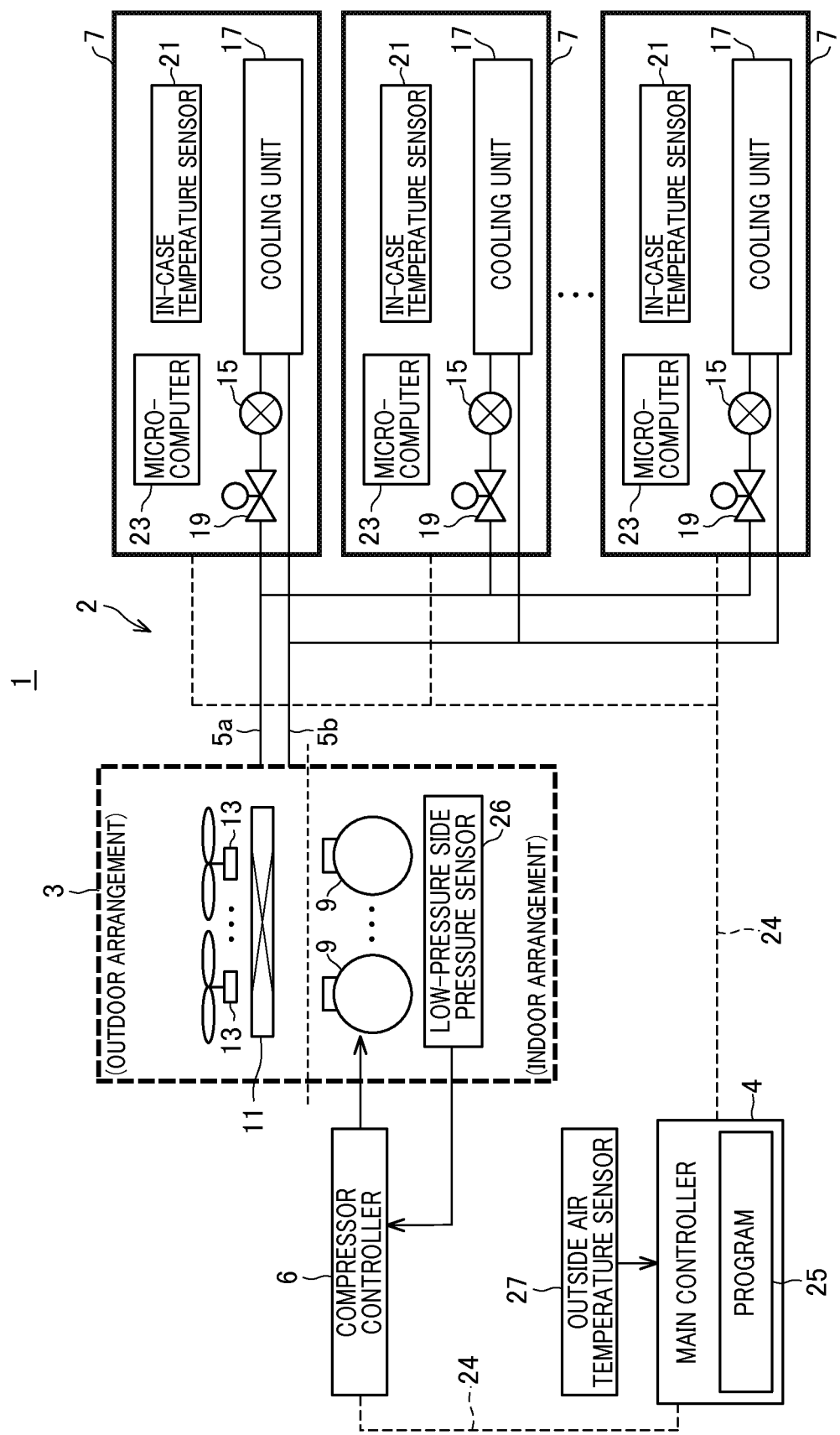
FIG. 6 is a diagram showing the construction of a cooling system according to a second embodiment.

FIG. 6 is a diagram showing the construction of the cooling system 1 according to a second embodiment. The same constructions as the above embodiment are represented by the same reference numerals, the duplicative description thereof is omitted and only different portions will be described in detail. In the following description, the number of compressors 9 is set to two, however, the number thereof is not limited to this value.

As in the case of the first embodiment, the cooling system 1 of this embodiment has a refrigeration circuit 2 in which plural low-temperature showcases 7 are connected to the rack system refrigerating machine 3 through a refrigerant pipe 5a as a liquid pipe and a refrigerant pipe 5b as a gas pipe in parallel, a main controller (main control device) 4 and a compressor controller (compressor control device) 6. The compressor controller 6 for controlling the plural compressors 9 constituting the rack system refrigerating machine 3 is provided separately from the rack system refrigerating machine 3.

The second embodiment is provided with the refrigeration circuit 2 in which plural low-temperature showcases 7 are connected in parallel through the refrigerant pipes 5a, 5b to the refrigerating machine 3 constructed by freely selecting compressors (compressors) 9 from some types of compressors and installing the selected compressors 9, the main controller 4 for generating and outputting control data of the compressors 9 installed in the refrigerating machine 3 on the basis of the cooling state of the low-temperature showcases 7, reception means (controller communicating unit 61) which is configured to acquire control setting required for capacity control of the compressors 9 installed in the refrigerating machine 3 and receives control data from the main controller 4, and a compressor controller 6 for performing the capacity control of the compressors 9 on the basis of the control setting and the control data.

According to the second embodiment, in the cooling system 1, the main controller 4 may generate, as the above control data, a delay time whose length corresponds to the stability of the cooling state of the low-temperature showcases 7, and the compressor controller 6 may change the capacity of the compressor 9 on the basis of the control setting when the state that the capacity of the compressors 9 should be changed continues over the delay time.

Furthermore, in the cooling system 1, the main controller 4 may generate the control data defining the target value of the cooling capacity of the compressors 9 on the basis of the cooling state of the low-temperature showcase, and the compressor controller 6 may change the capacity of the compressors 9 on the basis of the control setting so that the cooling capacity of the refrigerating machine 3 approaches to the target value.

Still furthermore, according to the second embodiment, in the cooling system 1, plural capacity fixed type compressors 9 having different capacities may be installed in the refrigerating machine 3, and the compressor controller 6 may perform the capacity control by turning on/off each of the compressors 9.

Figure 7:
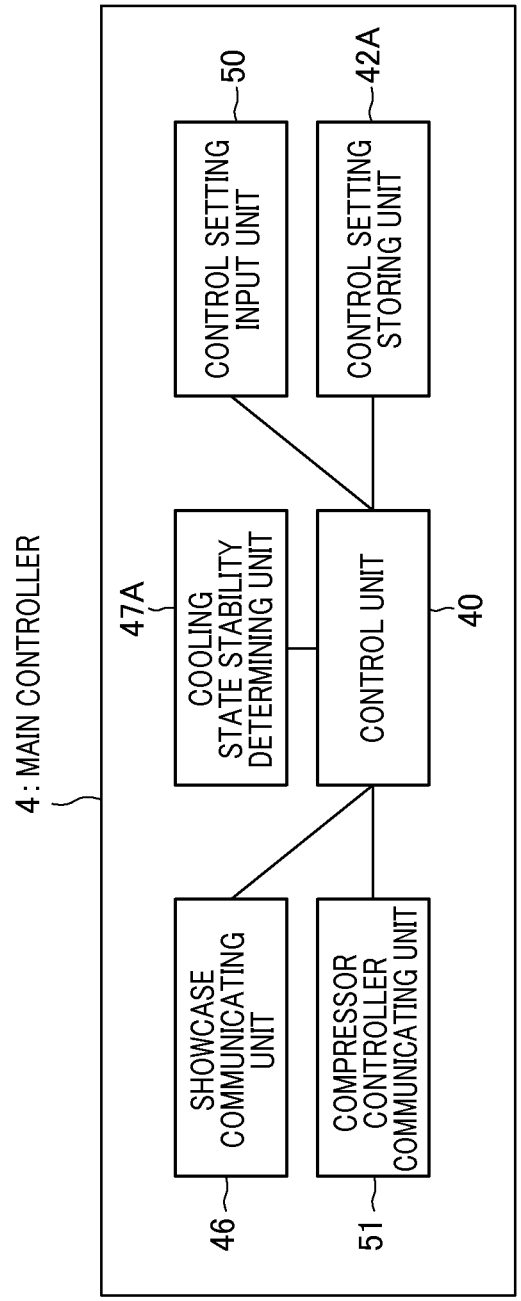
FIG. 7 is a block diagram showing the main controller.

FIG. 7 is a block diagram showing the functional construction of the main controller 4.

In this figure, the control unit 40 centrally controls each part of the main controller 4.

The control setting input unit 50 the control setting (compressor control setting) defining the control rule as information required for the capacity control to the compressors 9 installed in the rack system refrigerating machine 3 is input to the control setting input unit 50.

In the rack system refrigerating machine 3, the types (capacities) and number of the compressors 9 are determined at the installation time, and thus it is impossible to pre-install a program defining the capacity control of these compressors 9 into the compressor controller 6. Therefore, according to this embodiment, the information required for the capacity control to the compressors 9 installed in the rack system refrigerating machine 3 is input as the control setting into the main controller 4, and input to the compressor controller 6 while the control setting is contained in the above control data.

FIG. 8 is a diagram showing an example of the control rule used as the control setting (compressor control setting).

As shown in FIG. 8, the associating relationship between the turn-on/off of the respective compressors 9 and the total output is defined in the control rule, and step No. 1, step No. 2, . . . are allocated to combinations of the turn-on/off of the respective compressors 9 from the increasing order of the total output. That is, when the total output is reduced in capacity control, step No. smaller than the step No. corresponding to the combination of turn-on/off of the respective compressors 9 at that time is selected, and the total output can be reduced by turning on/off each compressor 9 according to the combination defined by the selected step No. Conversely, when the total output is increased, larger step No. is selected, and each compressor 9 is turned on/off according to the combination defined by the selected step No., whereby the total output can be increased.

Here, the rack system refrigerating machine 3 according to this embodiment is provided with two capacity fixed type compressors 9 which are different in capacity, and thus four combinations of on/off state are obtained as shown in the figure. At this time, when the compressors 9 have the same capacity, combinations having the same total output occur in the four combinations, and thus the number of the combinations having different total outputs is reduced. However, by using compressors 9 having different capacities, the number of combinations having different total outputs is maximized, and the total output of the compressors 9 can be minutely controlled.

The capacity control of the compressors 9 is performed to prevent occurrence of vainness in refrigerating capacity of the rack system refrigerating machine 3. In this embodiment, the refrigerant pressure at the low pressure side of the rack system refrigerating machine 3 (hereinafter referred to as "low-pressure side pressure") is used as the index of the cooling capacity, and the capacity control of the compressors 9 based on the capacity control rule is performed to keep the low-pressure side pressure to a predetermined value (hereinafter referred to as "low-pressure side pressure set value"). The low-pressure side pressure set value is set to a just enough value which enables the cooling capacity of the rack system refrigerating machine 3 to endure an environment under which the cooling capacity is most required in summer season.

In this embodiment, the control setting and the low-pressure side pressure set value are determined when the cooling system 1 is installed, and they are not subsequently varied. Therefore, in this embodiment, the control setting and the low-pressure side pressure set value can be held by the compressor controller 6, and the control setting and the low-pressure side pressure set value are transmitted as control data at the initial stage when the cooling system 1 is installed and held in the compressor controller 6.

Returning to FIG. 7, the control setting storage unit 42A stores the control setting input from the control setting input unit 50. When the compressor controller 6 can store and hold the control setting, the main controller 4 is not necessarily required to have the control setting storage unit 42A.

The showcase communicating unit 46 communicates with the microcomputer 23 of each low-temperature showcase 7 through the communication line 24. Through this communication, the deviation temperature between the in-case temperature and the in-case set temperature in each low-temperature showcase 7 is acquired.

A cooling state stability determining unit 47A determines the stability of the cooling state of the low-temperature showcases 7. This stability is determined on the basis of the degree of the time variation of the deviation temperature between the in-case temperature and the in-case set temperature. For example, when the variation (increasing rate or decreasing rate) of the deviation temperature per unit time exceeds a threshold value at which the in-store temperature is regarded as varying sharply, it means that the cooling performance of the low-temperature showcase 7 gets worse unless the cooling capacity of the rack system refrigerating machine 3 is varied while following the variation of the deviation temperature. Accordingly, in this case, "bad stability" is determined. Conversely, when the variation (increasing rate or decreasing rate) of the deviation temperature per unit time is small, the cooling state of the low-temperature showcases 7 is hardly affected even when the following performance of the cooling capacity of the rack system refrigerating machine 3 to the variation of the deviation temperature is bad in some degree, and thus "good stability" is determined.

The determination of the stability of the cooling state is executed for all the low-temperature showcases 7, and when "bad stability" is determined for even one low-temperature showcase 7, the determination result of "bad stability" is output from the cooling state stability determining unit 47A. When "good stability" is determined for all the low-temperature showcases 7, the determination result of "good stability" is output from the cooling state stability determining unit 47A.

The opening/closing of the liquid electromagnetic valve 19 provided to the low-temperature showcase 7 is interlocked with the deviation temperature and further the cooling state (the cooling degree in the showcase), and thus the stability of the cooling state of the low-temperature showcases 7 may be determined on the basis of the opening/closing frequency of the liquid electromagnetic valve 19. In this case, it is determined as stability how many times the in-case cooling state of the low-temperature showcase 7 is shifted between the cooling good state (in-case temperature≤in-case set temperature) and the bad state (in-case temperature>in-case set temperature) within a predetermined time, and when the in-case cooling state is shifted at a predetermined frequency or more, it is determined that the stability is bad.

When the stability of the cooling state is good for all the low-temperature showcases 7, the cooling performance of the low-temperature showcases 7 is not affected even when the following performance (responsibility) of the cooling capacity of the rack system refrigerating machine 3 to the variation of the deviation temperature of the low-temperature showcases 7 is lowered in some degree as described above. Furthermore, even when the cooling state of the low-temperature showcases gets worse temporarily, the cooling state may get good after some time elapses. In such a case, by prohibiting turn-on/off of the compressors 9, the power consumption caused by the turn-on/off of the compressors 9 can be reduced. Accordingly, in this embodiment, the capacity of the compressors 9 is varied under the state that the low-pressure side pressure is higher/lower the low-pressure side pressure set value, that is, when the state that the cooling capacity should be adjusted by performing the capacity control of the compressors 9 continues over a predetermined time (hereinafter referred to as "delay time"). When "good stability" is determined, the delay time is extended by a fixed time to reduce the following performance, and conversely when "bad stability" is determined, the delay time is shortened by a fixed time to enhance the following performance. Accordingly, in the case of "good stability", the on/off frequency of the compressors 9 is reduced and thus the energy saving can be performed. In the case of "bad stability", the following performance of the cooling capacity is quickly enhanced, and the cooling state of the low-temperature showcases 7 is excellently kept.

The compressor controller communicating unit 51 outputs the control data generated by the control unit 40 to the compressor controller 6 through the communication line 24. The control data concerned contains any of the control setting, the low-pressure side set value and the indicated value of the delay time (extended/shortened time).

Figure 9:
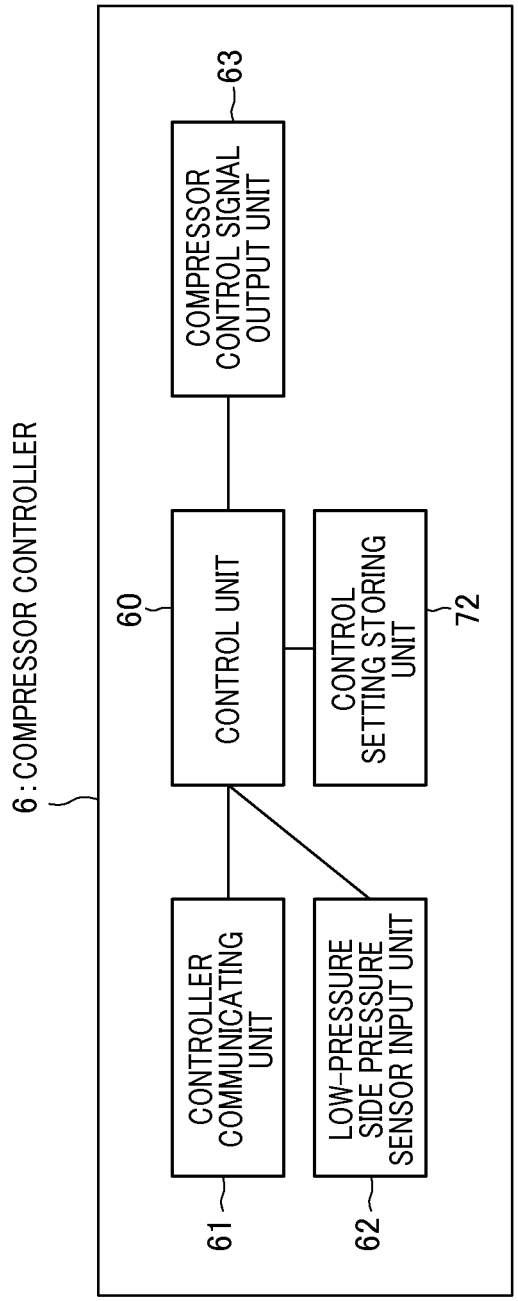
FIG. 9 is a block diagram showing a compressor controller.

FIG. 9 is a block diagram showing the functional construction of the compressor controller 6.

In this figure, in the compressor controller 6, a control setting storage unit 72 stores the control setting and the low-pressure side pressure set value contained in the control data. A control unit 60 compares the detection value of the low-pressure side pressure with the low-pressure side pressure set value, and changes the capacity of the rack system refrigerating machine 3 according to the capacitance control rule of the control setting when the detection value of the low-pressure side pressure continuously exceeds or falls below the low-pressure side pressure set value over the delay time.

Specifically, when the low-pressure side pressure is lower than the low-pressure side pressure set value, it is indicated that a needless cooling capacity occurs and thus the energy saving performance is bad. Conversely, when the low-pressure side pressure is higher than the low-pressure side pressure set value, it is indicated that the cooling capacity is insufficient and thus the cooling performance of the low-temperature showcases 7 detracts. Accordingly, when the state that the low-pressure side pressure is higher than the low-pressure side pressure set value continues over the delay time, the control unit 60 increments the step No. of the capacity control rule one by one in each case to enhance the cooling capacity. Conversely, when the state that the low-pressure side pressure is lower than the low-pressure side pressure set value continues over the delay time, the control unit 60 decrements the step No. one by one to gradually reduce the total output, thereby reducing the cooling capacity. Then, the control unit 60 generates a control signal to actuate only the compressors 9 of the combination indicated by the step No. A compressor control signal output unit 63 outputs the compressor control signal concerned to the compressors 9 of the rack system refrigerating machine 3.

When the control setting and the low-pressure side pressure set value are contained in the control data, the compressor controller 6 is not required to have the control setting storage unit 72. Furthermore, the compressor controller 6 may be provided with a control setting input unit and a display unit as in the case of the main controller 4, and the control setting may be directly input, not to the main controller 4, but to the compressor controller 6.

next, the operation of the thus-constructed cooling system 1 will be described.

Figure 10:
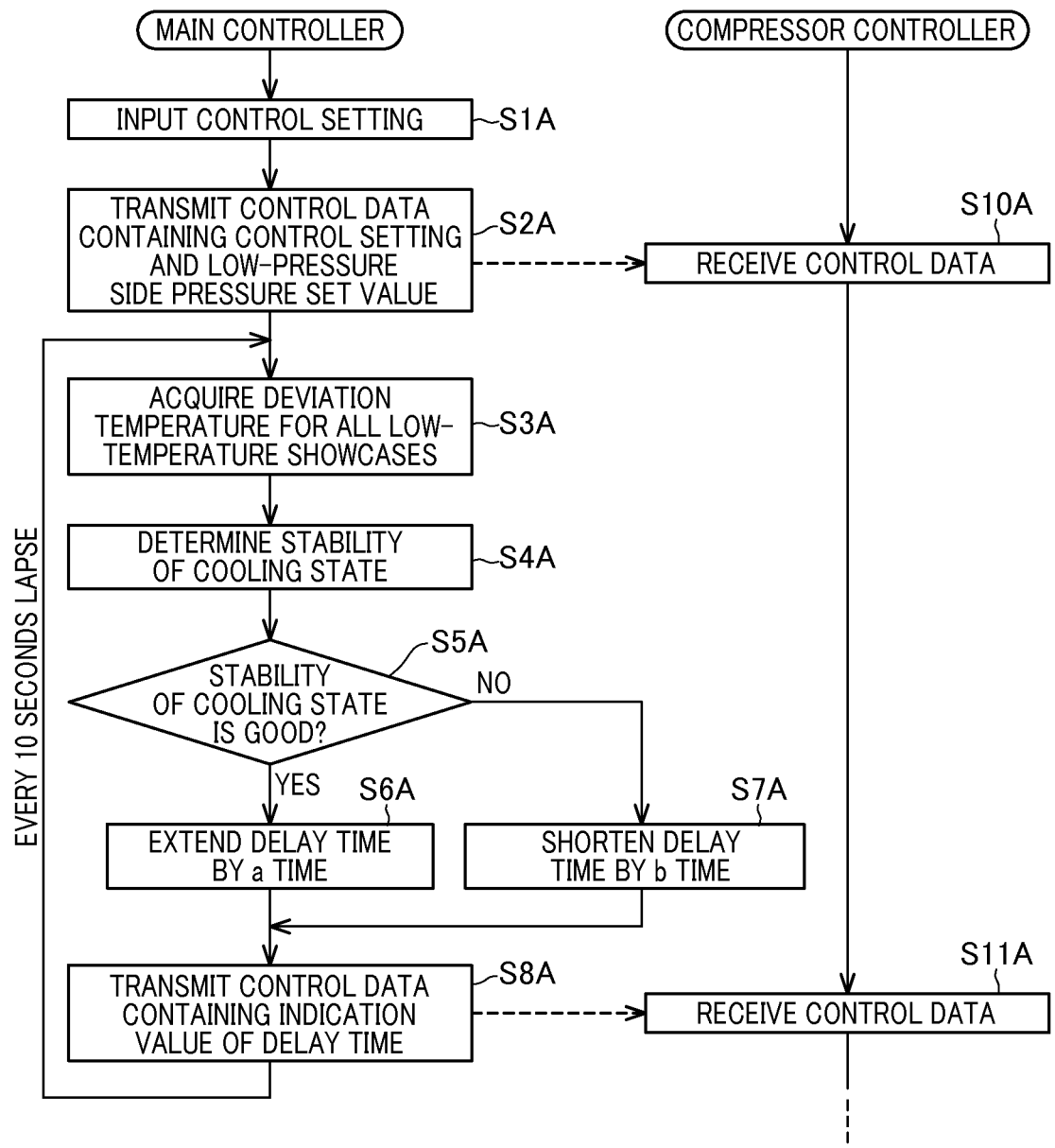
FIG. 10 is a flowchart showing the operation of the main controller and the compressor controller.

FIG. 10 is a flowchart showing the operation of the main controller 4 together with the operation of the compressor controller 6.

As described above, in the cooling system 1, the main controller 4 outputs the control data containing the control setting, the low-pressure side pressure set value and the delay time to the compressor controller 6, and the compressor controller 6 executes the capacity control of each compressor 9 of the rack system refrigerating machine 3 on the basis of this control data.

At this time, at the initial stage that the cooling system 1 is installed, the control setting is unclear, and thus the control setting based on the construction of the compressor 9 and the low-pressure side pressure set value are input to the main controller 4 by a service man or the like (step S1A), and the control setting and the low-pressure side pressure set value are transmitted as the control data to the compressor controller 6 (step S2A). This control data is received by the compressor controller 6 (step S10A), and held in the control setting storage unit 72 of the compressor controller 6.

Thereafter, the power source of the compressors 9 is turned on so that the compressors 9 is allowed to be operated, and the compressor controller 6 drives the compressors 9 of the rack system refrigerating machine 3 according to the capacity control rule of the control setting to cool the low-temperature showcases 7.

During the cooling operation of the low-temperature showcases 7, that is, during the operation of the cooling system 1, the main controller 4 acquires the deviation temperature between the in-case temperature and the in-case set temperature from all the low-temperature showcases 7 every fixed time (for example, 10 seconds to 60 seconds) (step S3A), and determines the cooling state of each low-temperature showcase 7 (step S4A). In this determination of the cooling state, as described above, the stability of the cooling state of each low-temperature showcase 7 is determined, "good stability" is determined when the stability of the cooling state is good in all the low-temperature showcases 7, and "bad stability" is determined when the stability of the cooling state is bad in even one low-temperature showcase 7.

When the stability of the cooling state is good (step S5A: YES), the main controller 4 extends the delay time by only a time to reduce the following performance of the capacity control of the compressor 9 to the variation of the cooling state of the low-temperature showcase 7 for energy saving (step S6A). Conversely, when the stability of the cooling state is bad (step S5A: NO), the main controller 4 shortens the delay time by only b time to enhance the following performance of the capacity control of the compressor 9 and keep the cooling performance of the low-temperature showcase 7 (step S7A). The a time and the b time may be set to the same time or different times.

When the main controller 4 determines the delay time on the basis of the cooling state of the low-temperature showcase 7 as described above, the main controller 4 transmits the indication value of the delay time as the control data to the compressor controller 6 (step S8A). Then, the main controller 4 returns the processing procedure to step S3 to monitor the cooling state of the low-temperature showcase 7.

Accordingly, the indication value of the delay time reflecting the cooling state of the low-temperature showcase 7 is received as the control data by the compressor controller 6 (step S11A), and the capacity control of the compressor 9 which reflects the delay time is executed in the compressor controller 6.

Figure 11:
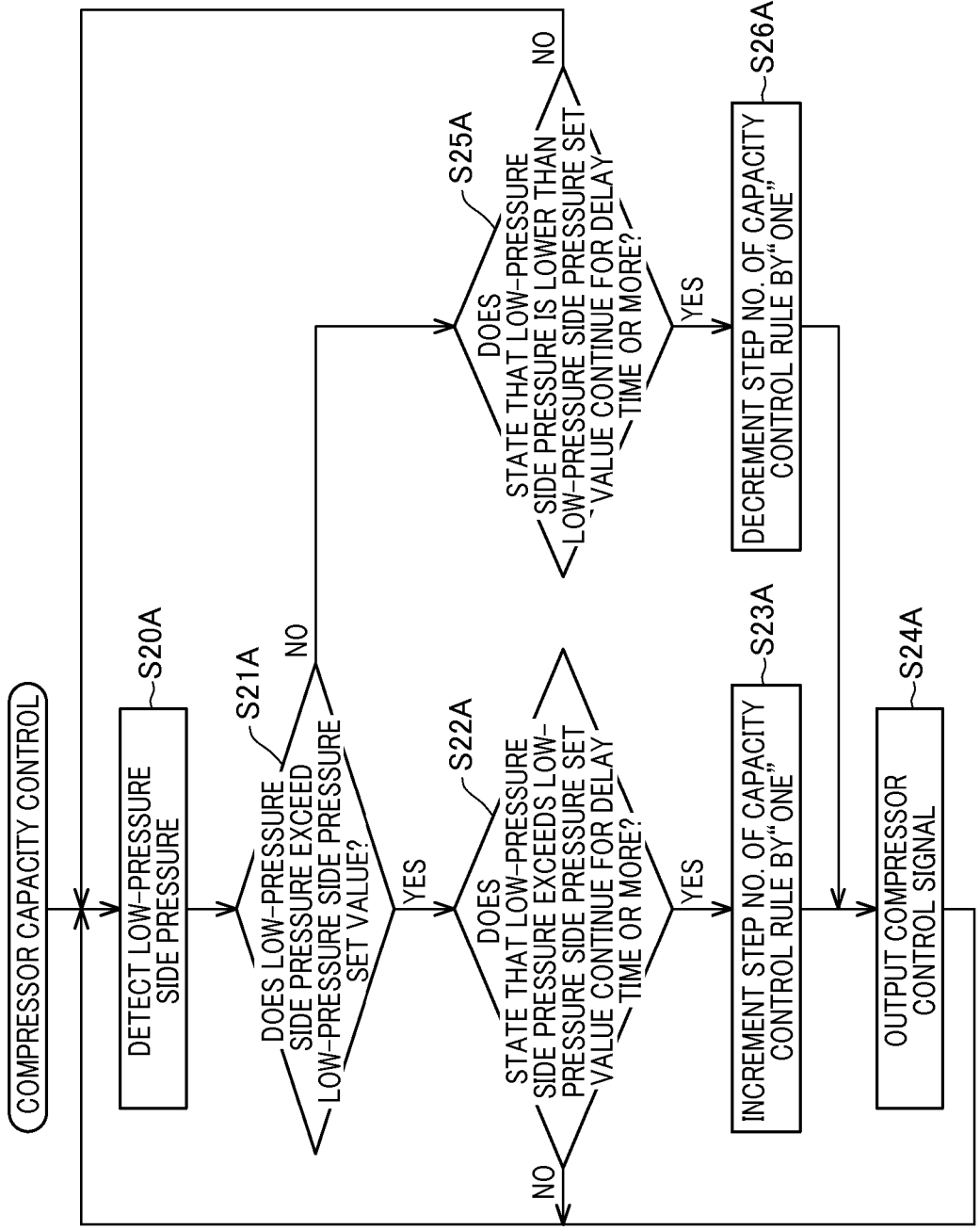
FIG. 11 is a flowchart showing the capacity control of the compressor controller.

FIG. 11 is a flowchart showing the capacity control of the compressor controller 6.

As shown in FIG. 11, the compressor controller 6 acquires the low-pressure side pressure from the low-pressure side pressure sensor 26 of the rack system refrigerating machine 3 every fixed time (step S20A), and compares the low-pressure side pressure with the low-pressure side pressure set value (step S21A). When the low-pressure side pressure exceeds the low-pressure side pressure set value and the cooling capacity of the rack system refrigerating machine 3 lacks (step S21A: YES), it is determined that this state continues over the above delay time (step S22A). When the state does not continue (step S22A: NO), the processing procedure is returned to the step S20A to avoid needless on/off, and when the state continues (step S22A: YES), the step No. of the capacity control rule is incremented by one to increase the cooling capacity and keep the cooling performance of the low-temperature showcase 7 (step S23A), and the compressor control signal based on this capacity control rule is generated and output to the compressors 9 (step S24A).

Furthermore, when the low-pressure side pressure is lower than the low-pressure side pressure set value and thus an extra cooling capacity occurs in the rack system refrigerating machine 3 (step S21A: NO), it is determined whether this state continues over the above delay time (step S25A). When the state does not continue (step S25A: NO), the processing procedure is returned to the step S20 to avoid needless ON/OFF. When the state continues (step S25A: YES), the step NO. of the capacity control rule is decremented by one to reduce the cooling capacity and reduce the power consumption of the rack system refrigerating machine 3 (step S26A), and the compressor control signal based on this capacity control rule is generated and output to the compressor 9 (step S24A).

The low-pressure side pressure set value as a determination criterion is provided with hysteresis when it is determined whether the low-pressure side pressure exceeds the low-pressure side pressure set value or not. That is, when the low-pressure side pressure exceeds a pressure which is higher than the low-pressure side pressure set value by only a predetermined value, "overrun" is determined. When the low-pressure side pressure falls below a pressure which is lower than the low-pressure side pressure set value by only a predetermined value, "underrun" is determined. The predetermined values may be transmitted from the main controller 4 to the compressor controller 6 together with the low-pressure side pressure set value or pre-installed into the program of the compressor controller 6.

As described above, according to this embodiment, the control setting (compressor control setting) required for the capacity control of the compressors 9 installed in the rack system refrigerating machine 3 can be acquired, and the compressor controller 6 which receives the control data based on the cooling state of the low-temperature showcase 7 from the main controller 4 and controls the compressors 9 on the basis of the control setting and the control data is provided. Therefore, even in the cooling system having the rack system refrigerating machine 3 which is configured by arbitrarily selecting the compressors 9 from some types of compressors and freely installing the selected compressors 9, the cooling capacity of the rack system refrigerating machine 3 can be controlled in accordance with the cooling state of the low-temperature showcase 7 without providing any microcomputer to the rack system refrigerating machine 3 concerned. Therefore, both the maintenance of the cooling performance of the low-temperature showcase 7 and the enhancement of the energy saving performance of the refrigerating machine can be implemented.

Particularly, according to this embodiment, the main controller 4 generates the delay time having the length corresponding to the stability of the cooling state of the low-temperature showcase 7 as the control data, and outputs the delay time to the compressor controller 6. The compressor controller 6 changes the capacities of the compressors 9 on the basis of the control setting when the state that the total output of the compressors 9 should be changed continues over the delay time. Therefore, when the cooling state of the low-temperature showcase 7 is stable, the on/off frequency of the compressors 9 is suppressed to enhance the energy saving performance. When the cooling state is not stable, the following performance of the cooling capacity of the rack system refrigerating machine 3 to the variation of the cooling state of the low-temperature showcase 7 is enhance, whereby the cooling performance of the low-temperature showcase 7 can be kept excellently.

Furthermore, according to this embodiment, the rack system refrigerating machine 3 is constructed by installing plural capacity fixed type compressors 9 having different capacities, and the capacity control is performed by turning on/off the respective compressors 9. Therefore, the total output can be varied at the same number as the number of the turn-on/off combinations of the compressors 9, and the number of different total outputs can be made larger as compared with the case where compressors having the same capacity are contained.

Third Embodiment

The construction of the cooling system 1 according to a third embodiment is the same as the cooling system 1 shown in FIG. 6. The constituent elements corresponding to those of each of the above embodiments are represented by the same reference numerals, and the duplicative description thereof is omitted. Only different portions will be described in detail. In the following description, the number of compressors 9 is set to two, however, the number of the compressors 9 is not limited to this value.

In this cooling system 1, the compressor controller 6 performs the capacity control by turning on/off each of plural compressors 9 on the basis of the control setting as information required for the capacity control of the compressors 9, the low-pressure side pressure set value from the main controller 4 and the delay time.

The third embodiment is provided with the refrigeration circuit 2 fin which plural low-temperature showcases 7 are connected in parallel through refrigerant pipes 5a and 5b to a refrigerating machine 3 constructed by arbitrarily selecting compressors 9 from some types of compressors and installing the selected compressors 9, a main controller 4 for setting and outputting a low-pressure side pressure set value as a set value of the low-pressure side of the refrigerating machine 3 on the basis of the cooling state of the low-temperature showcase 7, reception means (controller communicating unit 61) which is configured to acquire control setting required for capacity control to compressors 9 installed in the refrigerating machine 3 and receives the low-pressure side pressure set value from the main controller 4, and a compressor controller 6 for performing the capacity control of the compressors 9 on the basis of the control setting and whether the refrigerant pressure of the low-pressure side is larger or smaller than the low-pressure side pressure set value.

Furthermore, in the cooling system 1, the main controller 4 sets and outputs the delay time whose length corresponds to the stability of the cooling state of the low-temperature showcase 7, and the compressor controller 6 may change the capacity of the compressors 9 when the state that the refrigerant pressure of the low-pressure side exceeds the low-pressure side pressure set value or the state that the refrigerant pressure of the low-pressure side falls below the low-pressure side pressure set value continues over the delay time.

According to the third embodiment, the cooling system 1 may be equipped with a data base which learns the optimum low-pressure side pressure set value every operation environmental condition defining the operation environment of the cooling system 1 and registers the result of the learning.

The main controller 4 generates the low-pressure side pressure set value and the delay time for controlling the cooling capacity of the rack system refrigerating machine 3 on the basis of the cooling state of each low-temperature showcase 7, and outputs them to the compressor controller 6.

The low-pressure side pressure set value represents an index for the cooling capacity required to the rack system refrigerating machine 3, and the capacity control of the compressors 9 is executed on the basis of whether the low pressure side pressure is larger or smaller than the low-pressure side pressure set value. That is, when the low-pressure side pressure is larger than the low-pressure side pressure set value, it is indicated that surplus occurs in the cooling capacity. In this case, the cooling capacity is reduced for energy saving, and the total output of the compressors 9 is reduced. Conversely, when the low-pressure side pressure is smaller than the low-pressure side pressure set value, it is indicated that the cooling capacity lacks. In this case, the cooling capacity is increased and the total output of the compressors 9 is increased to keep the cooling performance of the low-temperature showcase 7 excellent.

The delay time is a parameter for varying the following performance (responsibility) of the cooling capacity of the rack system refrigerating machine 3 to the variation of the cooling state in accordance with the stability of the cooling state of the low-temperature showcase 7. The stability of the cooling state is estimated on the basis of the time variation of the cooling state of the low-temperature showcase 7, and "good" or "not good" of the cooling state of the low-temperature showcase 7 is estimated on the basis of whether the in-case temperature is larger than the in-case set temperature or not.

When the stability of the cooling state in the low-temperature showcase 7 is good, the cooling performance of the low-temperature showcase 7 is not affected even when the following performance of the cooling capacity of the rack system refrigerating machine 3 to the time variation of the cooling state of the low-temperature showcase 7 is reduced in some degree. Furthermore, even when the cooling state of the low-temperature showcase 7 gets worse temporarily, the cooling state may get better after some time elapses. In such a case, the compressors 9 are prohibited from being turned on/off, whereby the effect of reducing the power consumption in connection with the turn-on/off is expected. In this embodiment, attention is paid to this point as in the case of the second embodiment, and the same control as the second embodiment is performed.

That is, the state that the low-pressure side pressure higher/lower than the low-pressure side pressure set value, that is, the state that the cooling capacity should be adjusted by performing the capacity control of the compressors 9 continues over the delay time, the capacity of the compressor 9 is made variable. When "good stability" is determined, the delay time is extended by a fixed time to lower the following performance. Conversely, when "bad stability" is determined, the delay time is shortened by a fixed time to enhance the following performance.

Here, the cooling capacity required to the rack system refrigerating machine 3 is varied in accordance with the operation environmental conditions such as the in-store temperature, the out-of-store temperature and the time zone. Therefore, the main controller learns, every operation environmental condition, optimum low-pressure side pressure set values at which no needless cooling capacity occurs, and accumulates these values as a data base. The functional construction of the main controller 4 having the above construction will be described with reference to FIG. 12.

Figure 12:
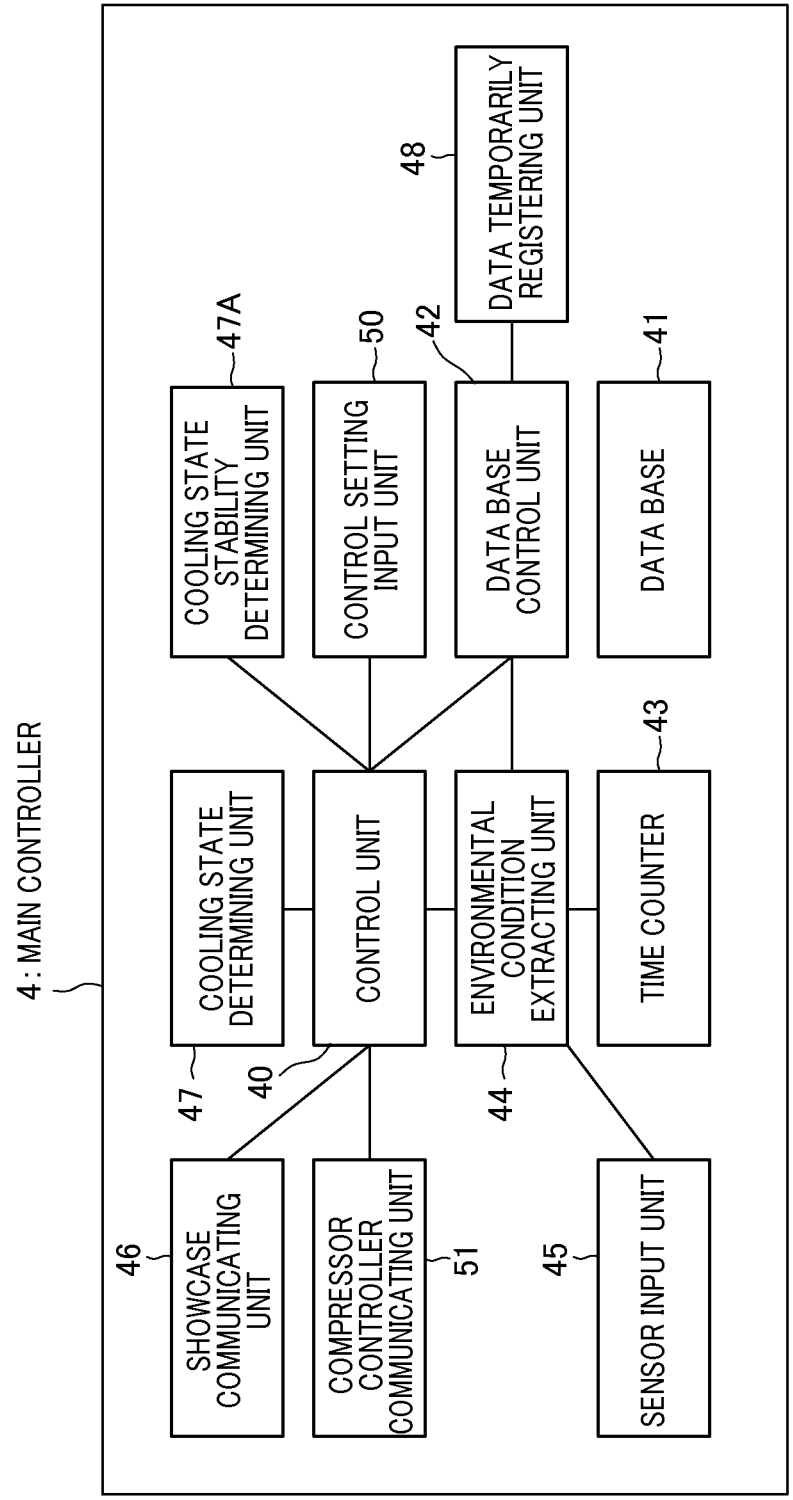
FIG. 12 is a block diagram showing a main controller of a cooling system according to a third embodiment.

FIG. 12 is a block diagram showing the functional construction of the main controller 4.

The main controller 4 is the same as the main controller 4 according to the first embodiment except that it has a cooling state stability determining unit 47A and also uses a delay time.

The cooling state stability determining unit 47A determines the stability of the cooling state of the low-temperature showcase 7. This stability is determined on the basis of the degree of the time variation of the deviation temperature between the in-case temperature and the in-case set temperature. For example, when the variation (increasing rate or decreasing rate) of the deviation temperature per unit time exceeds a threshold value at which the in-case temperature is regarded as sharply varying, it means that the cooling performance of the low-temperature showcase 7 gets worse unless the cooling capacity of the rack system refrigerating machine 3 is varied while following the variation of the deviation temperature. Accordingly, in this case, "bad stability" is determined. Conversely, when the variation (increasing rate or decreasing rate) of the deviation temperature per unit time is small, the cooling state of the low-temperature showcase 7 is hardly affected even when the following performance of the cooling capacity of the rack system refrigerating machine 3 to the variation of the deviation temperature is bad in some degree, and thus "good stability" is determined.

The determination of the stability of the cooling state is executed for all the low-temperature showcases 7, and when "bad stability" is determined for even one low-temperature showcase 7, the determination result of "bad stability" is output from the cooling state stability determining unit 47A. When "good stability" is determined for all the low-temperature showcases 7, the determination result of "good stability" is output from the cooling state stability determining unit 47A.

The opening/closing of the liquid electromagnetic valve 19 provided to the low-temperature showcase 7 and the determination result of the cooling state determining unit 47 are interlocked with the deviation temperature, and thus the stability of the cooling state of the low-temperature showcase 7 may be determined on the basis of the opening/closing frequency of the liquid electromagnetic valve 19 and the time variation of "good" or "not good" (whether "good" and "not good" are shifted to each other at a predetermined frequency or more within a predetermined time).

The control setting (compressor control setting) required for the capacitance control of the compressors 9 is input to the control setting input unit 50. The compressor controller communicating unit 51 outputs the control setting, the low-pressure side pressure set value and the delay time to the compressor controller 6 through the communication line 24.

More specifically, in the rack system refrigerating machine 3, the types (capacities) and number of the compressors 9 are determined when the rack system refrigerating machine 3 is installed, and thus it is impossible to preinstall a program defining the capacitance control of these compressors 9 in the compressor controller 6. Therefore, according to this embodiment, information required for the capacity control on compressors 9 installed in the rack system refrigerating machine 3 is input as control setting into the main controller 4, and input to the compressor controller 6 through the communication line 24 by communications.

The control rule used as the control setting is the same as the control rule of the second embodiment (see FIG. 8).

The functional construction of the compressor controller 6 is the same as that of FIG. 9. That is, the controller communicating unit 61 communicates with the main controller 4 through the communication line 24, receives the control setting, the low-pressure side pressure set value and the delay time, the control setting storing unit 72 stores the control setting and the low-pressure side pressure sensor input unit 62 is supplied with the detection value of the low-pressure side pressure from the low-pressure side pressure sensor 26 provided to the rack system refrigerating machine 3. The control unit 60 compares the detection value of the low-pressure side pressure with the low-pressure side pressure set value, and when the detection value of the low-pressure side pressure continues to exceed or fall below the low-pressure side pressure set value over the delay time, the control unit 60 changes the capacity of the rack system refrigerating machine 3 according to the capacity control rule of the control setting.

When the control setting is transmitted from the main controller 4 together with the low-pressure side pressure set value and the delay time while they are contained in each transmission operation, it is unnecessary for the compressor controller 6 to have the control setting storing unit 72.

Next, the operation of the thus-constructed cooling system 1 will be described.

Figure 13:
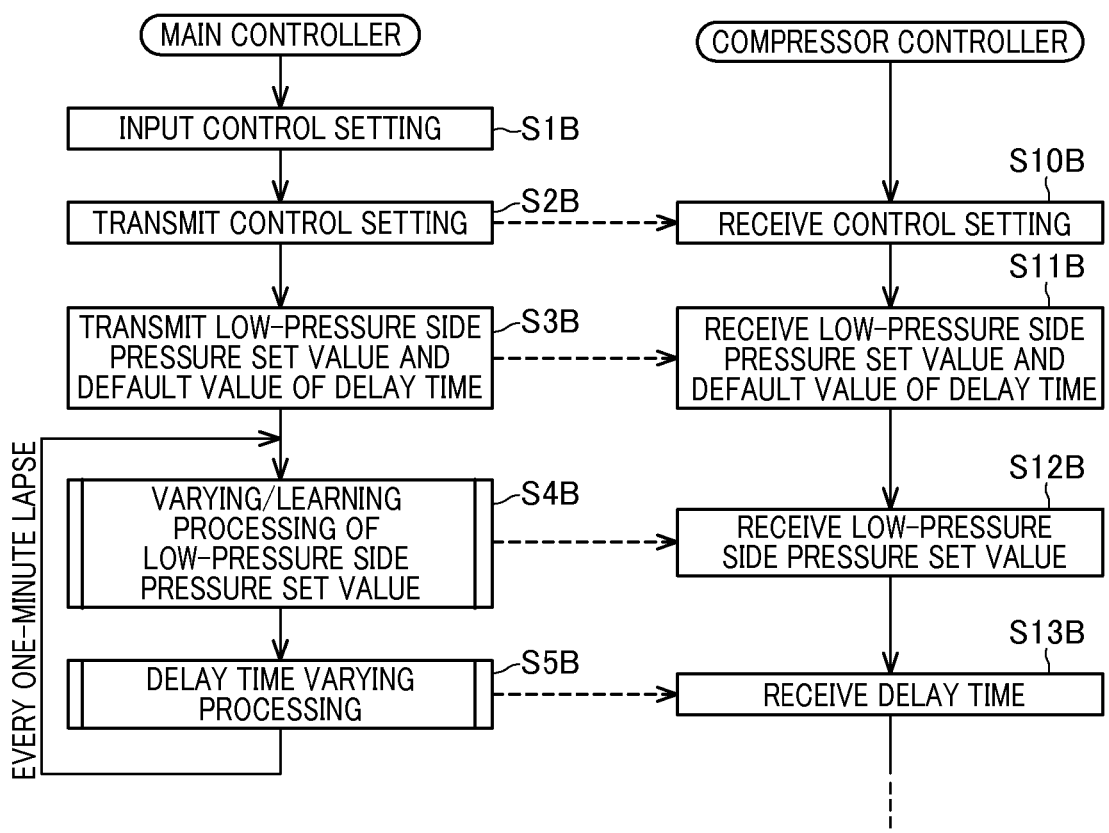
FIG. 13 is a flowchart showing the operation of the main controller and the compressor controller.

FIG. 13 is a flowchart showing the operation of the main controller 4 together with the operation of the compressor controller 6.

At the initial stage that the cooling system 1 is installed, the control setting is unclear, and the control setting based on the construction of the compressors 9 is input to the main controller 4 by a service man or the like (step S1B), and this control setting is transmitted to the compressor controller 6 (step S2B). This control setting is received by the compressor controller 6 (step S10B), and held in the control setting storing unit 72 of the compressor controller 6. Thereafter, the power source of the compressors 9 is turned on and allowed to be operated.

At the first operation start time after the cooling system 1 is installed, the default value is used because the low-pressure side pressure set value has not yet been learned. That is, the main controller 4 reads out from the data base 41 the default value of the low-pressure side pressure set value corresponding to the operation environmental condition comprising the three conditions of the in-store temperature Ti, the out-of-store temperature To and the time zone t, and outputs the default value to the compressor controller 6 together with the default value of the delay time (step S3B). The low-pressure side pressure set value and the delay time are received by the compressor controller 6 (step S11B), the capacity control of the compressors 9 is executed on the basis of these values. The operation under the capacity control will be described in more detail later. In step S3B, when a low-pressure side pressure set value is output to the compressor controller 6, the main controller 4 learns "good" or "not good" of the low-pressure side pressure set value and thus temporarily stores the low-pressure side pressure set value in association with the operation environmental condition.

Thereafter, the main controller 4 executes the low-pressure side pressure set value varying/learning processing (step S4B) and the delay time varying processing (step S5B) every fixed time (for example, from 10 seconds to 60 seconds).

The low-pressure side pressure set value varying/learning processing is the processing of varying the low-pressure side pressure set value in accordance with the variation of the operation environmental condition and learning the optimum low-pressure side pressure set value on the basis of "good" or "not good" of the cooling state of the low-temperature showcase 7. In this processing, the varied low-pressure side pressure set value is transmitted from the main controller 4, and the low-pressure side pressure set value is received by the compressor controller 6 and reflected to the capacity control.

The delay time varying processing is the processing of varying the delay time in accordance with the stability of the cooling state of the low-temperature showcase 7. The delay time varied in this processing is transmitted from the main controller 4, and the delay time concerned is received by the compressor controller 6 and reflected to the capacity control.

Next, the details of the low-pressure side pressure set value varying/leaning processing will be described.

Figure 14:
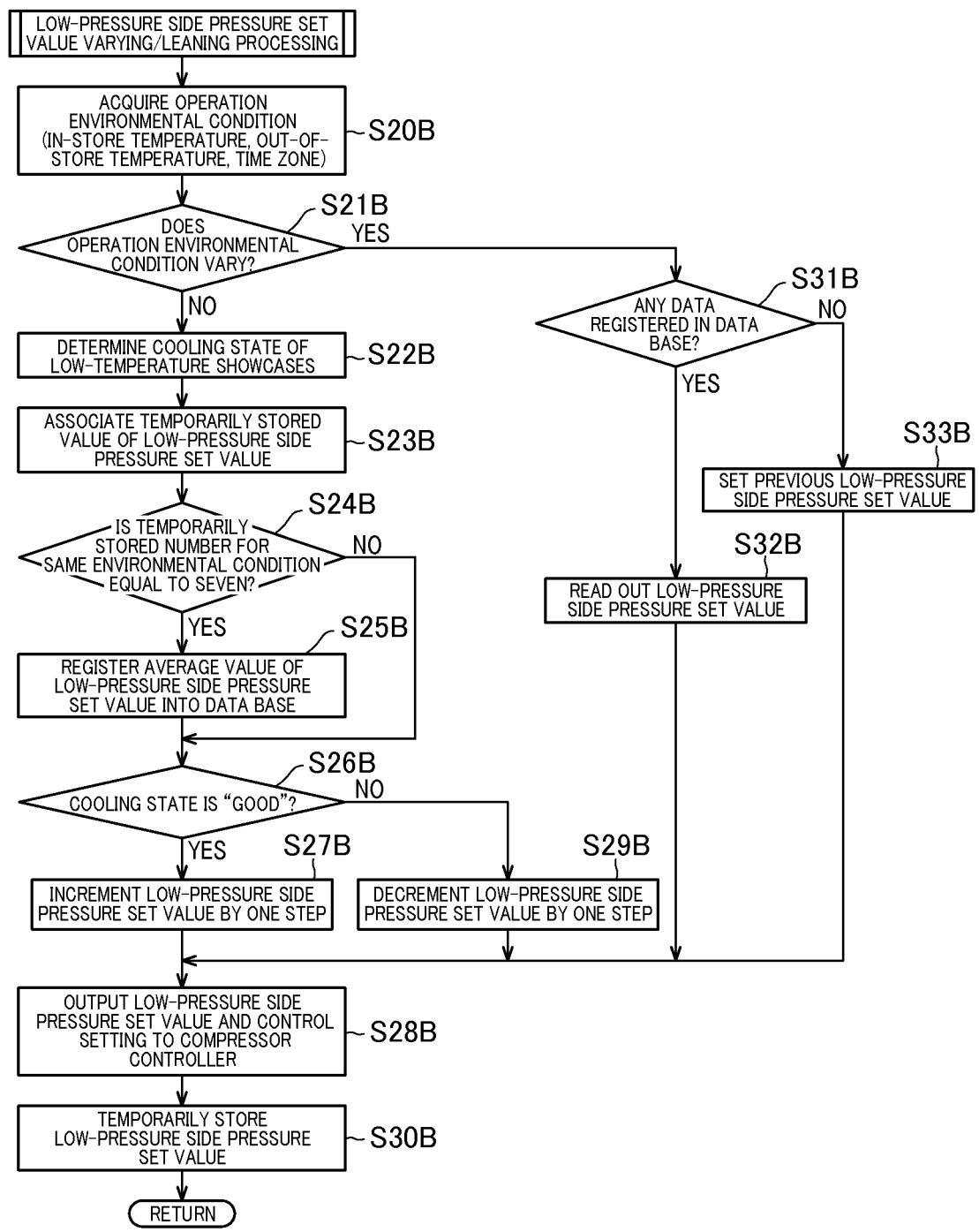
FIG. 14 is a flowchart of low-pressure side pressure set value varying/leaning processing.

FIG. 14 is a flowchart of the low-pressure side pressure set value varying/learning processing.

The main controller 4 first acquires the operation environmental condition comprising the in-store temperature Ti, the out-of-store temperature To and the time zone t (step S20B), and determines whether the operation environmental condition varies or not (step S21B). As described above, the in-store temperature Ti and out-of-store temperature To are varied every 5 degrees, the time zone t is discretized every hour, and when the variation width of any of the in-store temperature Ti, the out-of-store temperature To and the time zone t exceeds the discretization range, it is determined that the operation environmental condition varies.

When the operation environmental condition does to vary (step S21B: NO), in order to learn the optimum value of the low-pressure side pressure set value to this operation environmental condition, the main controller 4 determines the cooling state on the basis of the deviation temperature transmitted from each low-temperature showcase 7 (step S22B), and associates the result of "good or not good" of the cooling state with the temporarily stored low-pressure side pressure set value (step S23B). When the number of the temporarily stored low-pressure side pressure set value and the result of "good or not good" of the cooling state reaches a predetermined number (seven in the example of the figure) (step S24B: YES), the average value of the low-pressure side pressure set value is registered in the operation environmental condition of the data base 41 to perform the leaning of the optimum value (step S25B). When this optimum value learning is executed, there may be adopted any learning method of adopting the average value of only low-pressure side pressure set values which provide the "good" cooling state or adopting the average value after the low-pressure side set values are weighted in accordance with "good or not good" of the cooling state.

Subsequently, when the cooling state is "good" (step S26B: YES), the main controller 4 determines that there is an extra cooling capacity to the operation environmental condition at the present time, sets the low-pressure side pressure set value to a value increased by a fixed value (for example, 0.005 Mpa) (step S27B), and outputs the thus-set low-pressure side pressure set value to the compressor controller (step S28B). The compressor controller 6 controls the capacity of the compressors 9 of the rack system refrigerating machine 3 on the basis of the low-pressure side pressure set value transmitted from the main controller 4. At this time, the low-pressure side pressure set value is set to a high value, whereby the cooling capacity is lowered and the consumption power is reduced. When it is determined that there is an extra cooling capacity in the cooling system through this control, the cooling capacity of the rack system refrigerating machine 3 is lowered and the consumption power is reduced, and also the in-case deviation temperature of the low-temperature showcase 7 is kept to the neighborhood of the threshold value A.

On the other hand, when the cooling state is "not good" (step S26B: NO), the low-pressure side pressure set value is set to a value which is reduced by a fixed value (for example, 0.005 Mpa) (step S29B), and the thus-set low-pressure side pressure set value is output to the compressor controller 6 (step S28B). In the compressor controller 6, the low-pressure side pressure set value is set to a low value, whereby the cooling capacity is enhanced and the cooling state is improved to a "good" state.

When outputting the low-pressure side pressure set value to the compressor controller 6, the main controller 4 temporarily stores the "good or not good" of the low-pressure side pressure set value in association with the operation environmental condition to learn the "good or not good" of the low-pressure side pressure set value in step S25B (step S30B).

Through the processing as described above, the machine is operated for each year through shift of seasons, whereby low-pressure side pressure set values having a high power saving effect which are gradually obtained by actual measurements for the same operation environmental condition are successively registered in the data base 41.

On the other hand, when it is determined in step S21B that the operation environmental condition varies (step S21B: YES), the main controller 4 determines whether the proper low-pressure side pressure set value is registered in the data base 41 for this operation environmental condition (step S31B). When it is registered (step S31B: YES), the main controller 4 reads out the low-pressure side pressure set value concerned from the data base 41 (step S32B), and outputs and temporarily stores the low-pressure side pressure set value to the compressor controller 6 in step S28B and S30B. Accordingly, the optimum low-pressure side pressure set value having the high energy saving effect which has been already learned for the operation environmental condition is set and output as control data.

Furthermore, when no low-pressure side pressure set value is registered in the data base 41 (step S31B: NO), the main controller 4 regards that the in-store temperature Ti and the out-of-store temperature To does not greatly vary for about one minute, sets the same value as the just-before (before one minute) low-pressure side pressure set value (step S33), and outputs the value concerned to the compressor controller and temporarily stores it in the above steps S28B, S30B.

Next, the details of the delay time varying processing will be described.

Figure 15:
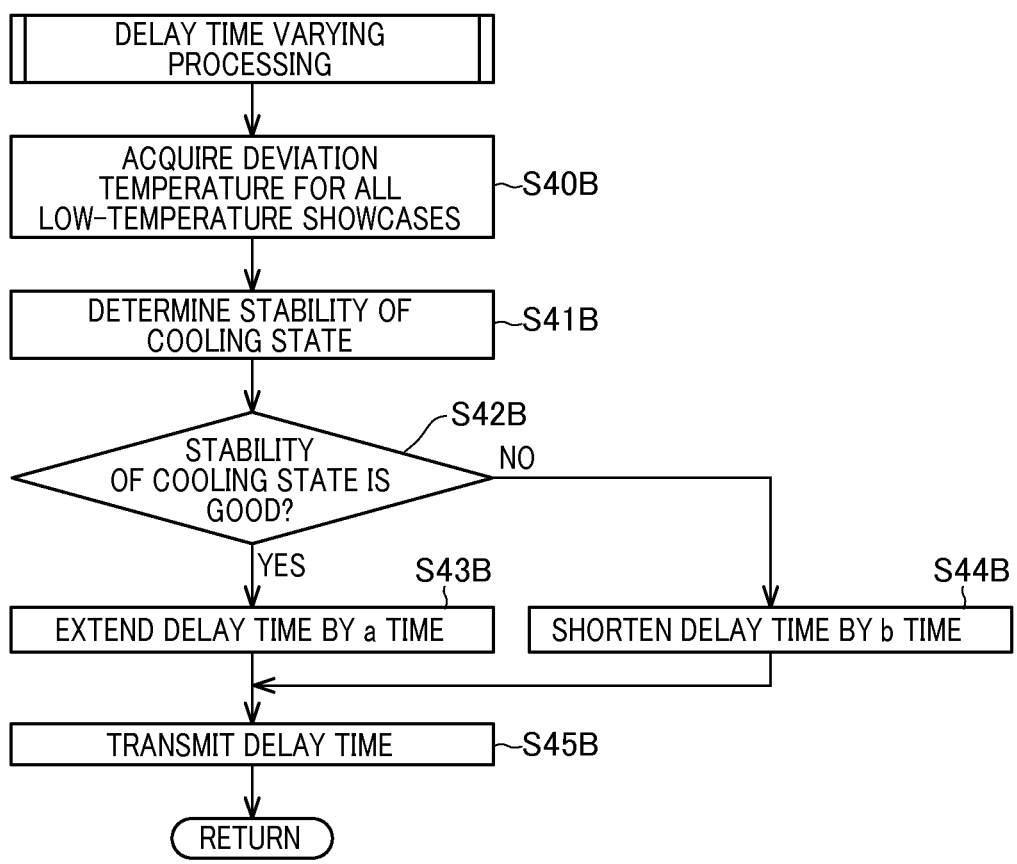
FIG. 15 is a flowchart showing delay time varying processing.

FIG. 15 is a flowchart showing the delay time varying processing.

The main controller 4 first acquires the deviation temperature between the in-case temperature and the in-case set temperature from all the low-temperature showcases 7 (step S40B), and determines the cooling state of each low-temperature showcase 7 (step S41B). In the determination of the cooling state, as described above, the stability of the cooling state of each low-temperature showcase 7 is determined. When the stability of the cooling state is good for all the low-temperature showcases 7, "good stability" is determined, and when the stability of the cooling state is bad for even one low-temperature showcase 7, "bad stability" is determined.

When the stability of the cooling state is good (step S42B: YES), the main controller 4 extends the delay time by only a time in order to lower the following performance of the capacity control of the compressors 9 to the variation of the cooling state of the low-temperature showcases 7 for the energy saving (step S43B). Conversely, when the stability of the cooling state is bad (step S42B: NO), the main controller 4 shortens the delay time by only b time in order to enhance the following performance of the capacity control of the compressors 9 and keep the cooling performance of the low-temperature showcases 7 (step S44B). The a time and the b time may be set to the same time or different times.

When determining the delay time on the basis of the cooling state of the low-temperature showcases 7 as described above, the main controller 4 transmits the delay time concerned to the compressor controller 6 (step S45B).

The capacity control of the compressor controller 6 is identical to the control shown in FIG. 11.

As described above, this embodiment is provided with the compressor controller 6 which is configured to acquire the control setting (compressor control setting) required for the capacity control of the compressors 9 installed in the rack system refrigerating machine 3 and receives the low-pressure side pressure set value based on the cooling state of the low-temperature showcases 7 from the main controller 4 to control the compressors 9 on the basis of the control setting and the low-pressure side pressure set value. Therefore, even in the cooling system 1 having the rack system refrigerating machine 3 constructed by arbitrarily selecting the compressors from some types of compressors and freely installing the selected compressors, the cooling capacity of the rack system refrigerating machine 3 can be controlled on the basis of the low-pressure side pressure set value according to the cooling state of the low-temperature showcases 7 without providing any microcomputer to the rack system refrigerating machine 3. Therefore, both the maintenance of the cooling performance of the low-temperature showcases 7 and the enhancement of the energy saving of the refrigerating machine can be implemented.

Particularly, according to this embodiment, the main controller 4 outputs to the compressor controller 6 the delay time whose length is set to the length corresponding to the stability of the cooling state of the low-temperature showcases 7. When the state that the total output of the compressors 9 should be changed continues over the delay time, the compressor controller 6 changes the capacity of the compressors 9 on the basis of the control setting. Therefore, when the cooling state of the low-temperature showcases 7 is stable, the turn-on/off frequency of the compressors 9 is suppressed to enhance the energy saving performance, and when the cooling state is not stable, the following performance of the cooling capacity of the rack system refrigerating machine 3 to the variation of the cooling state of the low-temperature showcases 7 is enhanced, thereby keeping the cooling performance of the low-temperature showcases 7 excellent.

Furthermore, this embodiment is configured to be provided with the data base 41 that learns the low-pressure side pressure set value for suppressing the power consumption of the rack system refrigerating machine 3 every environmental condition of the cooling system 1 without keeping the cooling performance of the low-temperature showcases 7 excellent, and registers the learning result. Therefore, when the refrigerating machine afterwards falls into the operation environmental condition concerned, the low-pressure side pressure set value can be quickly adjusted to the optimum low-pressure side pressure set value.

Fourth Embodiment

Figure 16:
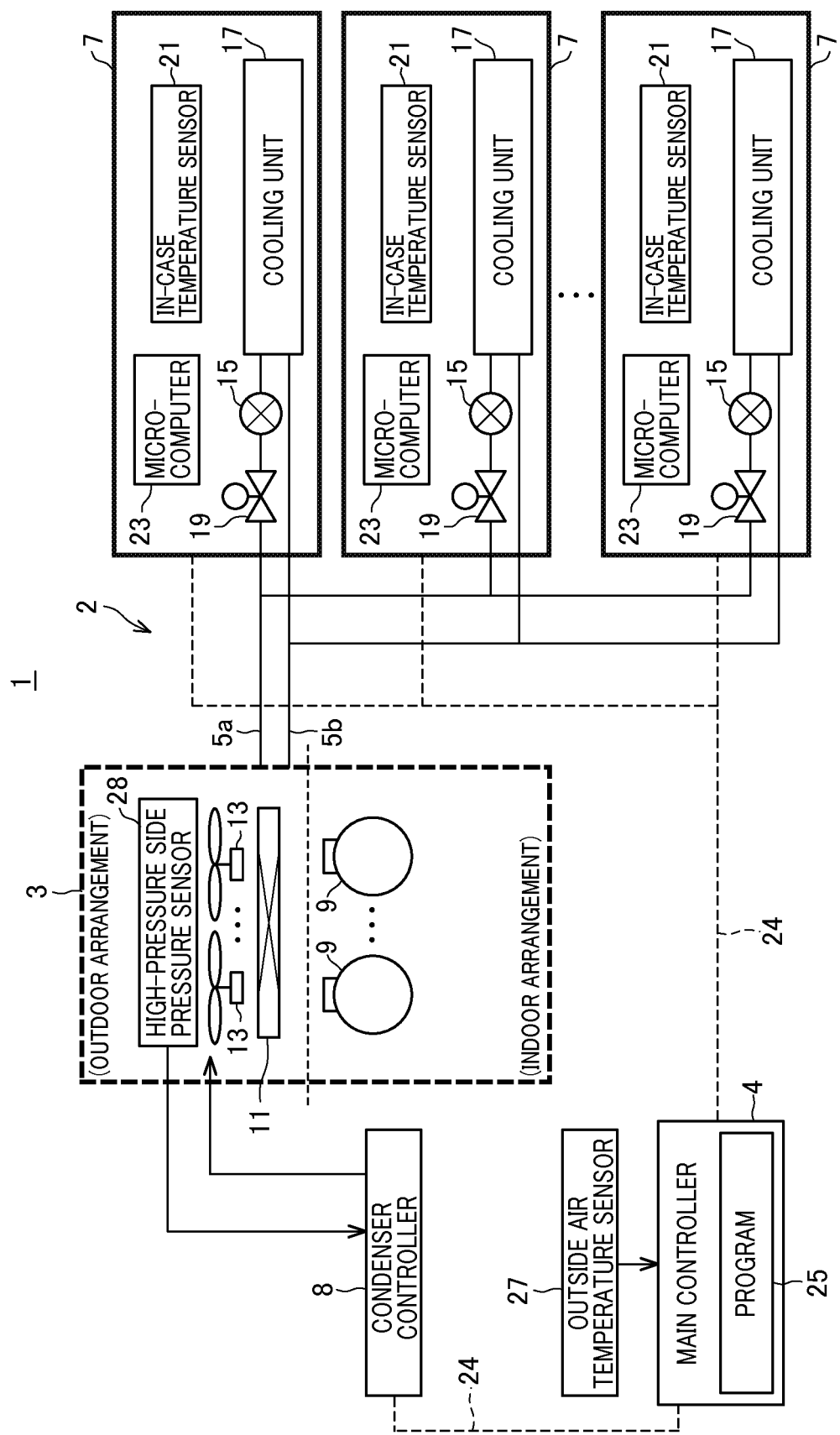
FIG. 16 is a diagram showing the construction of a cooling system according to a fourth embodiment.

FIG. 16 is a diagram showing the construction of the cooling system 1 according to a fourth embodiment. The constituent elements corresponding to each embodiment described above are represented by the same reference numerals, and the duplicative description thereof is omitted. Only different portions will be described in detail.

This cooling system has a condenser controller (condenser control device) 8 in place of the compressor controller 6. The rack system refrigerating machine 3 has plural compressors 9, a condenser (condenser) 11, plural condenser fans (fans for condensers) 13, and a high-pressure side pressure sensor 28 for detecting the pressure of refrigerant at a high pressure side, and the condenser 11 is a condenser which can be variably controlled in accordance with the number of condenser fans 13 to be operated. In the following description, the number of condenser fans 13 is set to six, however, the number of the condenser fans 13 is not limited to this value.

The fourth embodiment is provided with a refrigeration circuit in which plural low-temperature showcases 7 are connected in parallel through refrigerant pipes 5a and 5b to a refrigerating machine 3 constructed by arbitrarily selecting condensers 11 or/and condenser fans 13 from some types and freely installing the selected condensers 11 or/and condenser fans 13, a main controller 4 for generating and outputting control data for varying the condensation performance of the condensers 11 installed in the refrigerating machine 3 and outputting the control data, and a condenser controller 8 which is configured to acquire control setting required to control condensation performance to the condensers 11 installed in the refrigerating machine 3, has receiving means (controller communicating unit 81 described later) for receiving control data from the main controller 4, and controls the condensation performance of the condensers 11 on the basis of the control setting and the control data.

Furthermore, in the cooling system 1, the set values of cut-in and cut-off for each of the plural condenser fans 13 installed in the refrigerating machine 3 are defined on the basis of the high-pressure side pressure of the refrigerating machine 3 in the control setting. The main controller 4 generates, as the control data, data obtained by varying the set values of the cut-in and cut-off of each of the condenser fans 13 on the basis of the cooling state of the low-temperature showcases 7, and the condenser controller 8 may vary the condensation performance of the condensers 11 by turning on or off each of the condenser fans 13 on the basis of the control setting, the control data and the high-pressure side pressure of the refrigerating machine 3.

The rack system refrigerating machine 3 is constructed by freely selecting condensers 11 and condenser fans 13 as main elements for determining the cooling capacity from some types on the basis of the maximum cooling capacity required for the cooling system 1 and freely installing the selected condensers 11 and condenser fans 13. In this rack system refrigerating machine 3, it is unnecessary to package the constituent elements in one housing. Therefore, for example, there may be adopted such a layout that the compressors 9 are disposed indoors and the condensers 11 and the condenser fans 13 are disposed outdoors, whereby heat retention can be prevented. Furthermore, since there is no restriction of the housing to the installation space, the degree of freedom when the types of the condensers 11 and the condenser fans 13 and the number of the condenser fans 13 are determined is enhanced.

In the system refrigerating machine 3 described above, the types of the condensers 11 and the condenser fans 13 and the number of the condenser fans 13 are unstable, and thus it is difficult that a microcomputer is internally provided and the condensation performance of the condensers 11 is controlled by the microcomputer so as to obtain the energy saving effect as in the case of a conventional refrigerating machine. Therefore, in the cooling system 1 of this embodiment, the condenser controller 8 for controlling the condensation capacity of plural condensers 11 provided to the rack system refrigerating machine 3 are provided separately from the rack system refrigerating machine 3.

The main controller 4 generates control data for controlling the condensation capacity of the condensers 11 of the rack system refrigerating machine 3 on the basis of the cooling state of each low-temperature showcase 7 and outputs the control data to the condenser controller 8, and the condenser controller 8 turns on/off each of the plural condenser fans 13 on the basis of the control data from the main controller 4. The detailed construction thereof will be described later.

Figure 17:
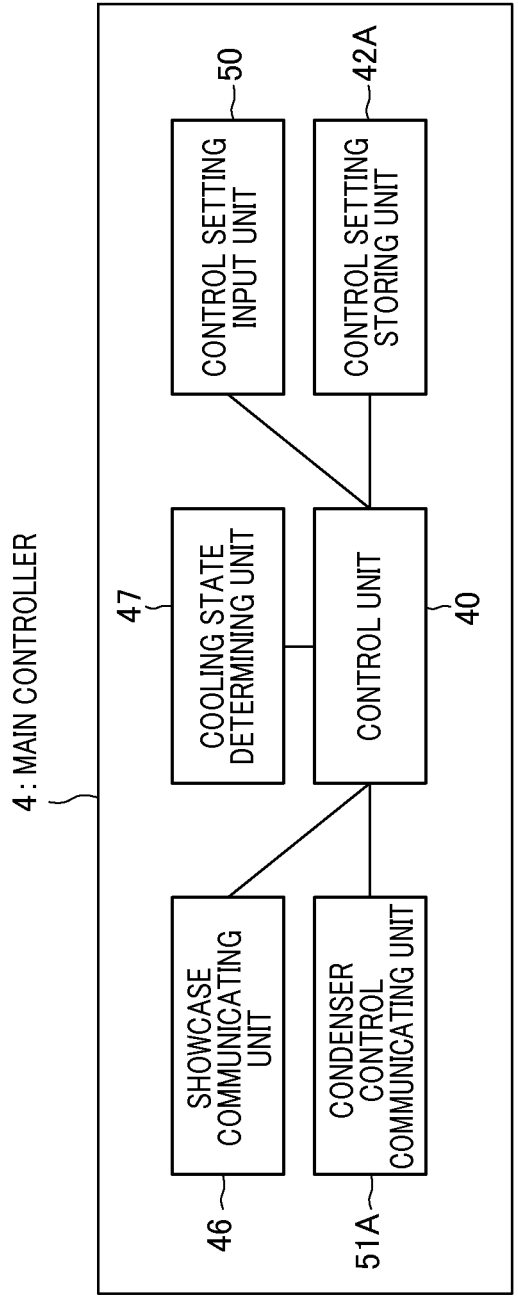
FIG. 17 is a block diagram showing the main controller.

FIG. 17 is a block diagram showing the functional construction of the main controller 4.

In this main controller 4, control setting (condenser control setting) defining information required for the condensation capacity control of the condensers 11 installed in the rack system refrigerating machine 3 is input to the control setting input unit 50.

More specifically, in the rack system refrigerating machine 3, the types of the condensers 11 and the number of the condenser fans 13 are determined when they are installed, and thus it is impossible to preinstall a program defining the condensation capacity control of the condensers 11 in the condenser controller 8. Therefore, in this embodiment, the information required for the condensation capacity control of the condensers 11 installed in the rack system refrigerating machine 3 is input as control setting into the main controller 4, and the control setting is input to the condenser controller 8 with being contained in the control data.

FIG. 18 is a diagram showing an example of the control setting (condenser control setting).

Figure 19:
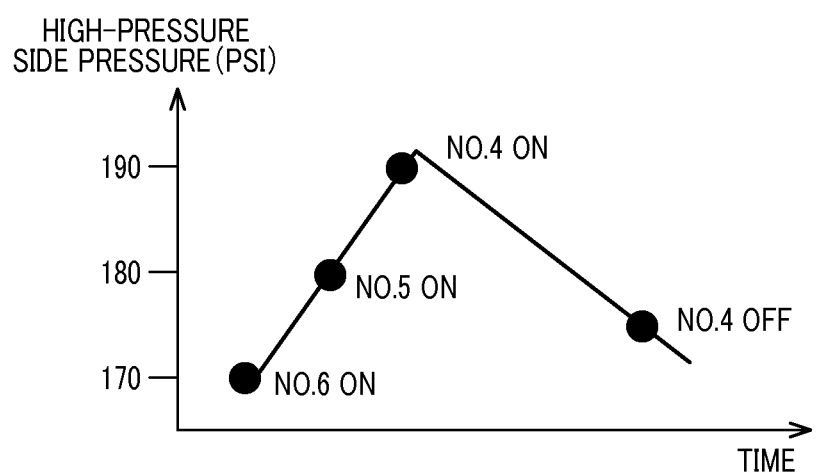
FIG. 19 is a diagram showing condensation capacity control based on control setting.

As shown in FIG. 18, with respect to the control setting, the cut-in/cut-off high-pressure side pressure is defined for each of the condenser fans 13, and it is regulated that the condenser fans 13 are successively cut in as the high-pressure side pressure increases. The cut-in/cut-off high-pressure side pressure described above is provided with a hysteresis to prevent chattering. In the condensation capacity control, the high-pressure side pressure of the rack system refrigerating machine 3 is monitored. As shown in FIG. 19, a condenser fan 13 which reaches the cut-in pressure due to the variation of the high-pressure side pressure is turned on, and a condenser fan 13 which reaches the cut-out pressure is turned off. Accordingly, only condenser fans 13 meeting the condensation capacity required to the rack system refrigerating machine 3 are driven, so that the power consumption can be reduced as compared with the case where all the condenser fans 13 are driven.

On the basis of the cooling state of the low-temperature showcases 7, the cut-in/cut-off set values of each of the condenser fans 13 are varied so as to obtain a sufficient condensation capacity with which the cooling state (cooling degree) of the low-temperature showcases 7 is kept excellent, and this will be described later.

Returning to FIG. 17, the control setting storing unit 42A stores the control setting input from the control setting input unit 50, and the showcase communicating unit 46 communicates with the microcomputer 23 of each low-temperature showcase 7 through the communicating line 24. Through this communication line, the in-store temperature, the in-store set temperature and the deviation temperature in each low-temperature showcase are obtained.

As described with reference to the above embodiments, the cooling state determining unit 47 determines whether the cooling state of each low-temperature showcase 7 is good or not good. When the determination result of the cooling state determining unit 47 is "good", it is estimated that a surplus occurs in the cooling capacity of the rack system refrigerating machine 3, and there is no problem in the cooling state of the low-temperature showcases 7 even when the condensation capacity is lowered. Therefore, in order to reduce the power consumption of the rack system refrigerating machine 3 by reducing the condensation capacity, the control unit 40 increases the set value of the cut-in/cut-off of each condenser fan 13 defined in the control setting by only a predetermined value ΔP so that the number of condenser fans 13 to be operated is reduced. Conversely, when the determination result of the cooling state determining unit 47 is "not good", in order to indicate that the cooling capacity of the rack system refrigerating machine 3 lacks, the control unit 40 reduces the set value of the cut-in/cut-out of each condenser fan 13 defined in the control setting by only the predetermined value ΔP to increase the number of condenser fans 13 to be operated, so that the cooling state of the low-temperature showcases 7 is kept excellent by increasing the condensation capacity.

The condenser controller communicating unit 51A outputs the control data generated by the control unit 40 to the condenser controller 8 through the communication line 24. The control data contains the variable value of the control setting which varies the set value of the cut-in/cut-off in accordance with the cooling state of the low-temperature showcase 7.

Figure 20:
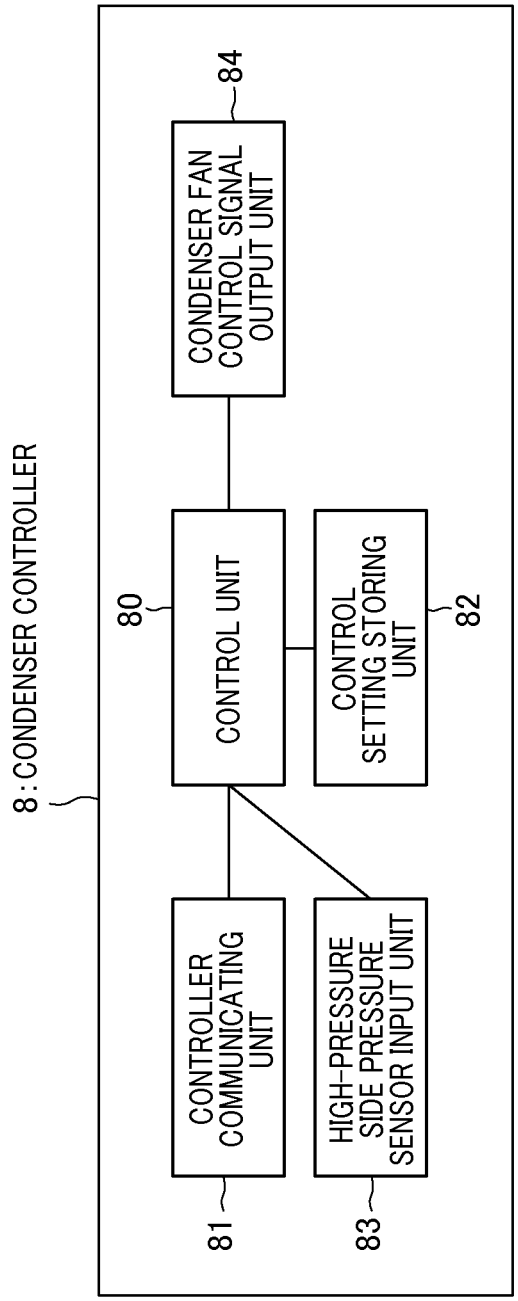
FIG. 20 is a block diagram showing a condenser controller.

FIG. 20 is a block diagram showing the functional construction of the condenser controller 8.

In FIG. 20, the control unit 20 centrally controls each part of the condenser controller 8, and generates a condenser fan control signal for controlling turn-on/off of each of the condenser fans 13 installed in the rack system refrigerating machine 3. For example, it is constructed to have a microcomputer.

A controller communicating unit 81 communicates with the main controller 4 through the communication line 24 to receive the control setting and the control data (a variable value of the control setting). A control setting storing unit 82 stores the control setting. A detection value of the high-pressure side pressure is input to a high-pressure side pressure sensor input unit 83 from the high-pressure side sensor 28 which is provided to the rack system refrigerating machine 3. The control unit 80 generates the condenser fan control signal for turning on/off the condenser fans 13 according to the detection value of the high-pressure side pressure and the control setting. A condenser fan control signal output unit 84 outputs the condenser fan control signal to each condenser fan 13 of the rack system refrigerating machine 3.

Next, the operation of the thus-constructed cooling system 1 will be described.

Figure 21:
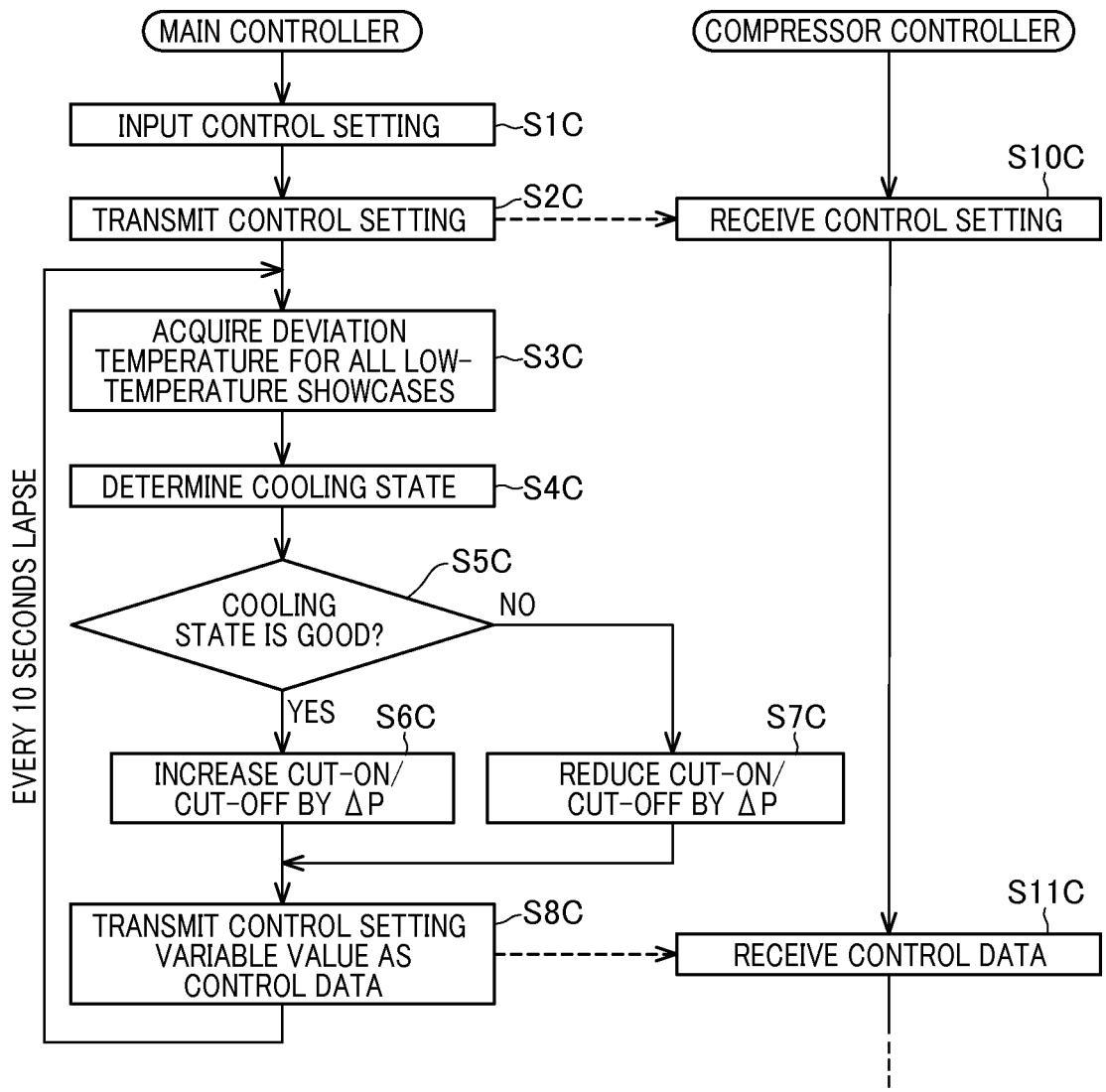
FIG. 21 is a flowchart showing the operation of the main controller and the condenser controller.

FIG. 21 is a flowchart showing the operation of the main controller 4 together with the operation of the condenser controller 8. At the initial stage that the cooling system 1 is installed, the control setting is unclear and thus the control setting based on the construction of the condensers 11 and the condenser fans 13 is input to the main controller 4 by a service man or the like (step S1C). This control setting is transmitted to the condenser controller 8 (step S2C). The control setting concerned is received by the condenser controller 8 (step S10C), and held in the control setting storage unit 82 of the condenser controller 8. Thereafter, the power source of the compressors 9 is turned on to start the operation of the compressors 9, and the low-temperature showcases 7 are cooled.

During cooling of the low-temperature showcases 7, that is, during operation of the cooling system 1, the main controller 4 acquires the deviation temperature between the in-case temperature and the in-case set temperature from all the low-temperature showcases 7 every fixed time (for example, 10 seconds to 60 seconds) (step S3C, and determines the cooling state of each low-temperature showcase 7. Then, when the cooling state is good (step S5C: YES), the main controller 4 increases the value of the cut-in/cut-off of each condenser fan 13 by only ΔP (step S6C) to reduce the power consumption of the rack system refrigerating machine 3. Conversely, when the cooling state is not good (step S5C: NO), the main controller 4 reduces the value of the cut-in/cut-off of each condenser fan 13 by only ΔP (step S7C) to enhance the condensation capacity, thereby keeping the cooling performance of the low-temperature showcases 7.

In the above processing, the set value of the cut-in/cut-off is increased/reduced by only ΔP in conformity with the cooling state of the low-temperature showcases 7, whereby the condensation capacity is stepwise varied and thus rapid variation is prevented.

When varying the set value of the cut-in/cut-off of each condenser fan 13 on the basis of the cooling state of the low-temperature showcase 7 as described above, the main controller 4 transmits the varied set value (control set variable value) as control data to the condenser controller 8 (step S8C).

Then, the main controller 4 returns the processing procedure to step S3C to monitor the cooling state of the low-temperature showcases 7.

Accordingly, The control setting which is varied in accordance with the cooling state of the low-temperature showcases 7 is received as control data by the condenser controller 8 (step S11C), and the condenser controller 8 performs condensation capacity control of the condensers 11 while reflecting the control setting.

As described above, according to this embodiment, there is provided the condenser controller 8 which is configures to acquire the control setting (condenser control setting) required for the condensation capacity control of the condensers 11 installed in the rack system refrigerating machine 3, receives the control data for varying the condensation capacity on the basis of the cooling state of the low-temperature showcases 7 from the main controller 4, and controls the condensation capacity of the condensers 11 on the basis of the control setting and the control data. Therefore, even in the cooling system 1 having the rack system refrigerating machine 3 constructed by arbitrarily selecting condensers 11 from some types of condensers and freely installing the selected condensers, the cooling capacity of the rack system refrigerating machine 3 can be controlled through the condensation capacity in accordance with the cooling state of the low-temperature showcases 7 without providing any microcomputer to the rack system refrigerating machine 3. Therefore, both the maintenance of the cooling performance of the low-temperature showcases 7 and the enhancement of the energy saving of the refrigerating machine are implemented.

Particularly, according to this embodiment, with respect to the control setting, the cut-in/cut-off set values are defined by the high-pressure side pressure every plural condenser fans 13, the main controller 4 generates data of varied cut-in/cut-off set value of each condenser fan 13 as control data on the basis of the cooling state of the low-temperature showcase 7, and the condenser controller 8 turns on or off each condenser fan 13 on the basis of the control setting, the control data and the high-pressure side pressure of the rack system refrigerating machine 3.

According to this construction, the number of condenser fans 13 to be actuated is determined in accordance with the required condensation capacity. Therefore, the power consumption of the rack system refrigerating machine 3 can be reduced in accordance with the cooling state of the low-temperature showcase 7.

Furthermore, according to this construction, in a case where the degree of contribution to the condensation capacity is different every condenser fan 13 due to the relative arrangement position to the condensers 11, the air flowing amount, the rotational number, etc. of the condenser fans 13 when the turn-on/off of each of the condenser fans 13 is defined for high-pressure side pressure, a higher energy saving effect can be obtained by determining the order of turn-on/off of the respective condenser fans 13 to the high-pressure side pressure in accordance with the degree of the contribution to the condensation capacity.

The embodiments described above are merely embodiments representing the present invention, and any modification and application may be made within the scope of the invention.

For example, in each of the above embodiments, the plural capacity fixed type compressors 9 are provided to construct the rack system refrigerating machine 3, however, the present invention is not limited to this style. The number of compressors 9 may be set to one, and the cooling capacity may be controlled by turning on/off the compressor 9 concerned.

Furthermore, the present invention is not limited to the construction that the capacity is controlled by the plural capacity fixed type compressors 9. The rack system refrigerating machine may be constructed by installing capacity fixed type inverter compressors, and the capacity may be controlled by subjecting the inverter compressors concerned to inverter control. In this case, the control rule of the inverter control corresponding to the deviation pressure between the detection value of the low-pressure side pressure and the low-pressure side pressure set value is used as the control setting.

Furthermore, for example, in the first to third embodiments described above, the rack system refrigerating machine 3 is constructed by freely combining compressors as main elements for determining the cooling capacity. However, condensers (condensers) may be alternatively adopted as main elements. In this case, as described with reference to the fourth embodiment, the high-pressure side pressure is used as a control index for the cooling capacity of the rack system refrigerating machine 3, and the capacity (air flowing amount) of the condenser fans is controlled to control the high-pressure side pressure.

In the first embodiment described above, the maintenance of the cooling performance of the low-temperature showcases 7 and the energy saving performance of the rack system refrigerating machine 3 are performed by reflecting the "good or not good" of the cooling state to the capacity control of the compressors 9. However, the stability of the cooling state of the low-temperature showcases 7 may be reflected to the capacity control of the compressors 9.

Furthermore, the operation environmental condition shown in the respective embodiment is not limited to itself. Furthermore, in the embodiments, the low-pressure side pressure set value of the refrigerating machine is adjusted as the control data, however, the present invention is not limited to this style. Any control target associated with the cooling capacity and power consumption of the cooling system may be targeted. Furthermore, the low-pressure side pressure set value is adjusted at a period of one minute in each embodiment. However, the present invention is not limited to this style. a period of 10 minutes, 30 minutes, one hour, one hour and 30 minutes, two hours or the like may be properly selected in accordance with a use situation.

DESCRIPTION OF REFERENCE NUMERALS

1 cooling system
2 refrigeration circuit
3 rack system refrigerating machine
4 main controller (main control device)
5*a*, 5*b* refrigerant pipe
6 compressor controller (main element control device)
7 low-temperature showcase (load facilities)
9 compressor (main element)
11 condenser (main element)
13 condenser fan (main element)
21 in-case temperature sensor
22 in-store temperature sensor (indoor temperature sensor)
26 low-pressure side pressure sensor
27 outside air temperature sensor
41 data base
47 cooling state determining unit
50 control setting input unit
61 control communicating unit (receiving means)
Te average deviation temperature
Ti in-store temperature
To out-of-store temperature
t time zone

The invention claimed is:

1. A cooling system comprising:
a refrigeration circuit constructed by connecting a plurality of load facilities in parallel through a refrigerant pipe to a rack system refrigerating machine defined as an assembly that comprises capacity-fixed type compressors for varying a cooling capacity of the rack system refrigerating machine, a condenser and a condenser fan, a number of the compressors constituting the rack system refrigerating machine being freely determinable at a user side when the rack system refrigerating machine is installed;
a main control device configured to acquire control data for controlling the cooling capacity of the rack system refrigerating machine on the basis of a cooling state of the load facilities only after the rack system refrigerating machine is installed at the user side, learn the control data in accordance with variation of an operation environmental condition under which the rack system refrigerating machine is installed and operated so that an optimum cooling capacity is obtained under the environmental condition, and output the learned control data, the control data comprising control setting for defining a compressor control rule for determining a number of compressors to be operated in accordance with a cooling state of the load facilities, and a low-pressure side pressure set value as a target value of the cooling capacity of the rack system refrigerating machine which is variable in accordance with the operation environmental condition; and
a compressor control device provided separately from the rack system refrigerating machine, and configured to receive the control data from the main control device only after the rack system refrigerating machine is installed at the user side, and control the number of compressor to be operated on the basis of the control data.

2. The cooling system according to claim 1, wherein the compressor control device controls the compressors on the basis of the control setting so that the cooling capacity of the rack system refrigerating machine approaches to the target value.

3. The cooling system according to claim 1, wherein the control setting is information for defining capacity control of the compressors constructing the rack system refrigerating machine.

4. The cooling system according to claim 2, wherein the main control device accumulates the low-pressure side pressure set values and a determination result of the cooling state of the loading facilities at a predetermined period to learn optimum low-pressure side pressure set values under operation environmental conditions, and registers the optimum low-pressure side pressure set values into a data base in association with the operation environmental conditions, and the compressor control device receives a detection value of low-pressure side pressure of the rack system refrigerating machine to calculate a deviation pressure between the detection value and the optimum low-pressure side pressure set value contained in the received control data, and controls the compressors on the basis of the deviation pressure and the control setting contained in the received control data.

5. The cooling system according to claim 4, wherein the control setting is information for defining capacity control of the compressors constructing the rack system refrigerating machine in accordance with the deviation pressure between the low-pressure side pressure of the rack refrigerating machine and the optimum low-pressure side pressure set value.

6. The cooling system according to claim 1, wherein the load facilities are low-temperature showcases that construct a refrigeration cycle with the rack system refrigerating machine.

7. The cooling system according to claim 1, wherein the main control device is configured to acquire the control setting and output the control setting to the compressor control device only after the rack system refrigerating machine is installed at the user side.

8. A cooling system comprising:
- a refrigeration circuit constructed by connecting a plurality of load facilities in parallel through a refrigerant pipe to a rack system refrigerating machine defined as an assembly that comprises capacity-fixed type compressors for varying a cooling capacity of the rack system refrigerating machine, a condenser and a condenser fan, a number of the compressors constituting the rack system refrigerating machine being determined when the compressors are installed;
- a main control device configured to generate and output control data for controlling the cooling capacity of the rack system refrigerating machine on the basis of a cooling state of the load facilities, the control data having control setting that determines a compressor control rule for determining the number of compressors to be operated in accordance with the cooling state of the load facilities and is input to the main control device only after the rack system refrigerating machine is installed, and a low-pressure side pressure set value that is a target value of the cooling capacity of the rack system refrigerating machine and is variable in accordance with an operation environmental condition under which the rack system refrigerating machine is installed and operated; and
- a compressor control device configured to acquire the control data from the main control device, determine the number of compressors to be operated on the basis of the acquired control data, and control the compressors on the basis of the control setting and the low-pressure side pressure value, wherein the main control device is configured to learn the low-pressure side pressure set value in accordance with variation of the operation environmental condition of the rack system refrigerating machine to acquire an optimum value of the low-pressure side pressure value, register the optimum value of the low-pressure side pressure set value into a data base, generate control data containing at least the optimum value of the low-pressure side pressure set value read out from the register and output the generated control data to the compressor control device when the operation environmental condition varies.

* * * * *